(12) United States Patent
Kato et al.

(10) Patent No.: US 10,779,919 B2
(45) Date of Patent: *Sep. 22, 2020

(54) INTERDENTAL CLEANING TOOL

(71) Applicants: Keisuke Kato, Takatsuki (JP); Makiko Yamane, Takatsuki (JP); Shinya Sakurai, Takatsuki (JP)

(72) Inventors: Keisuke Kato, Takatsuki (JP); Makiko Yamane, Takatsuki (JP); Shinya Sakurai, Takatsuki (JP)

(73) Assignee: SUNSTAR SUISSE S.A., Etoy (CH)

( * ) Notice: Subject to any disclaimer, the term of this patent is extended or adjusted under 35 U.S.C. 154(b) by 127 days.

This patent is subject to a terminal disclaimer.

(21) Appl. No.: 15/580,451

(22) PCT Filed: Jun. 8, 2016

(86) PCT No.: PCT/JP2016/067151
§ 371 (c)(1),
(2) Date: Dec. 7, 2017

(87) PCT Pub. No.: WO2016/199835
PCT Pub. Date: Dec. 15, 2016

(65) Prior Publication Data
US 2018/0168783 A1  Jun. 21, 2018

(30) Foreign Application Priority Data

Jun. 8, 2015 (JP) .................. 2015-116137
Jun. 8, 2015 (JP) .................. 2015-116155
(Continued)

(51) Int. Cl.
*A61C 15/00* (2006.01)
*A61C 15/02* (2006.01)
(Continued)

(52) U.S. Cl.
CPC .............. *A61C 15/02* (2013.01); *A46B 3/005* (2013.01); *A46B 5/0029* (2013.01); *A46B 9/04* (2013.01);
(Continued)

(58) Field of Classification Search
CPC ........ A61C 15/00; A61C 15/02; A61C 15/046
(Continued)

(56) References Cited

U.S. PATENT DOCUMENTS

| 1,746,591 A * | 2/1930 | Heymann | A61C 15/02 |
| | | | 132/329 |
| 2010/0024839 A1* | 2/2010 | Kalbfeld | A46B 1/00 |
| | | | 132/329 |
| 2015/0257861 A1* | 9/2015 | Dishon | A46B 3/005 |
| | | | 132/329 |

FOREIGN PATENT DOCUMENTS

| JP | 3002668 B1 | 1/2000 |
| JP | 2001-506514 A | 5/2001 |

(Continued)

OTHER PUBLICATIONS

International Search Report for International Application No. PCT/JP2016/067151 dated Jul. 26, 2016.

*Primary Examiner* — Rachel R Steitz
(74) *Attorney, Agent, or Firm* — Kratz, Quintos & Hanson, LLP

(57) ABSTRACT

Provided is an interdental cleaning tool which has a simple configuration and can effectively prevent an occurrence of breakage of a core base portion when inserting the interdental cleaning tool into an interdental space or during interdental cleaning without reducing the productivity of the interdental cleaning tool, and provided is a method for manufacturing the interdental cleaning tool. A plurality of cleaning portion recesses (14) which penetrate a cleaning soft portion (21) and form recesses (14a) in a core base (Continued)

portion (12) are formed on each of a first side portion and a second side portion of a cleaning portion (2) at an interval in an axial direction of a cleaning soft portion (21), and at least one of the plurality of cleaning portion recesses (14) is formed so that an opening of the core base portion recess formed in the core base portion has a shape elongated in the axial direction of the cleaning portion.

7 Claims, 23 Drawing Sheets

(30) Foreign Application Priority Data

Jun. 8, 2015 (JP) .................................. 2015-116156
Jun. 8, 2015 (JP) .................................. 2015-116165

(51) Int. Cl.
*A46B 3/00* (2006.01)
*A46B 9/04* (2006.01)
*B29C 45/14* (2006.01)
*B29C 45/26* (2006.01)
*B29C 45/16* (2006.01)
*A46B 5/00* (2006.01)
*A46B 15/00* (2006.01)

(52) U.S. Cl.
CPC .... *A46B 15/0093* (2013.01); *B29C 45/14065* (2013.01); *B29C 45/1676* (2013.01); *B29C 45/2626* (2013.01); *A46B 5/0037* (2013.01); *A46B 2200/108* (2013.01); *B29C 2045/14147* (2013.01)

(58) Field of Classification Search
USPC .................................................. 132/321, 329
See application file for complete search history.

(56) References Cited

FOREIGN PATENT DOCUMENTS

| | | |
|---|---|---|
| JP | 4236571 B2 | 3/2009 |
| JP | 2013-188299 A | 9/2013 |
| JP | 2013-192866 A | 9/2013 |
| WO | 2013176297 A1 | 11/2013 |
| WO | 2014005659 A1 | 1/2014 |
| WO | 2014023424 A1 | 2/2014 |

* cited by examiner

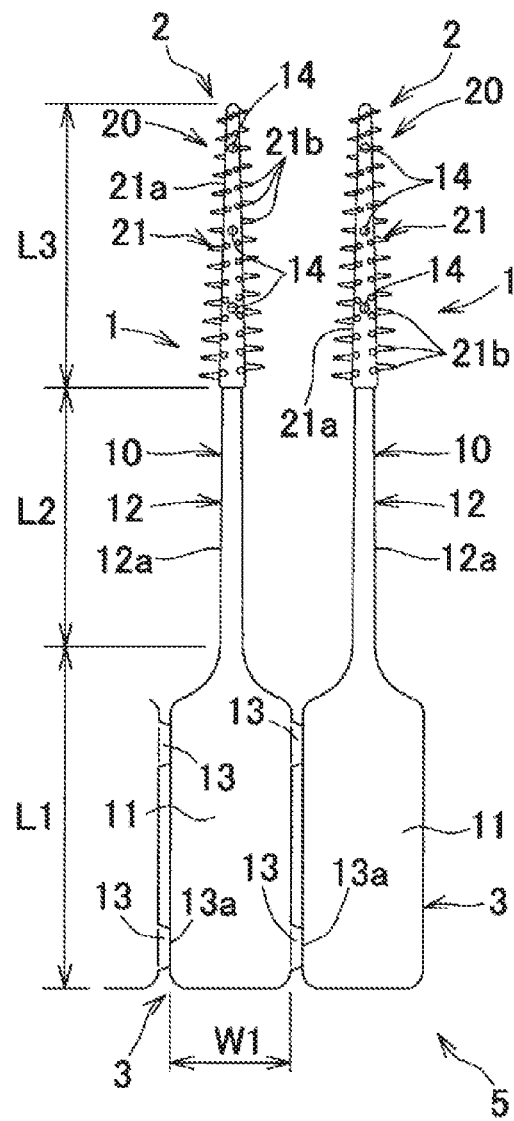
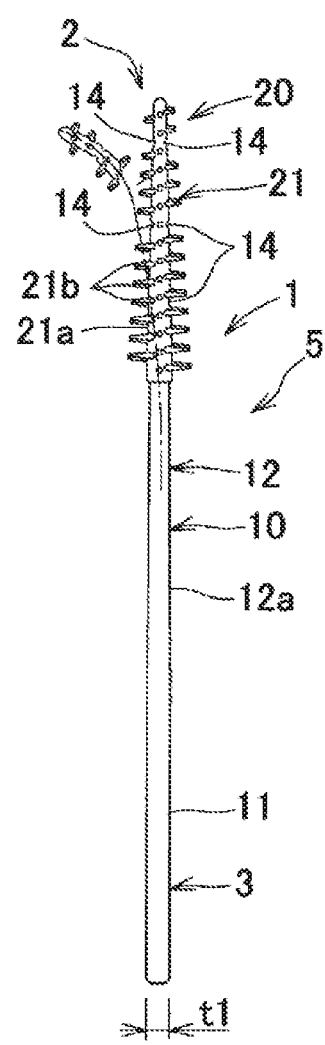
FIG. 2 (a)
FIG. 2 (b)

FIG.25(a)
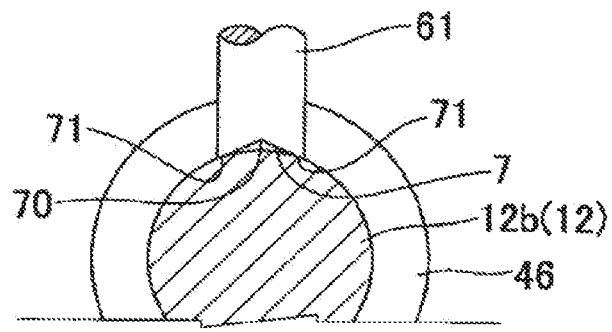
FIG.25(b)
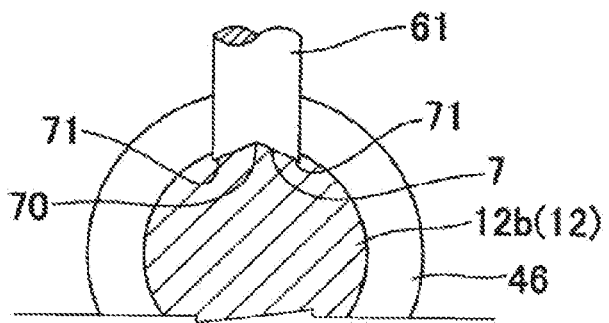
FIG.25(c)
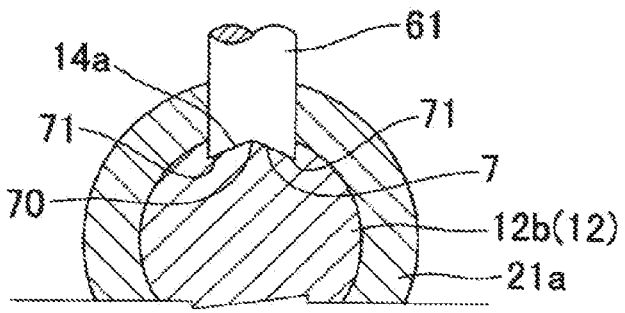

FIG. 27

| | | Example 1 | Example 2 | Example 3 | Example 4 | Comparative Example 1 | Comparative Example 2 |
|---|---|---|---|---|---|---|---|
| Plane shape of recess | | Japanese come reeling shaped | Japanese come reeling shaped | Rectangular | Rectangular | Circular | Circular |
| Depth of recess | mm | 0.01 | 0.02 | 0.01 | 0.03 | 0.05 | 0.1 |
| Diameter or width of recess | mm | 0.4 | 0.4 | 0.4 | 0.4 | 0.2 | 0.1 |
| Length of recess | mm | 0.8 | 1 | 0.8 | 1 | – | – |
| Opening area of recess | mm² | 0.21 | 0.37 | 0.24 | 0.4 | 0.031 | 0.008 |
| Finite element analysis result | | | | | | | |
| Stress value | MPa | 4.83 | 4.85 | 4.8 | 4.75 | 9.54 | 9.98 |
| Stress scale | | | | | | | |

FIG. 29

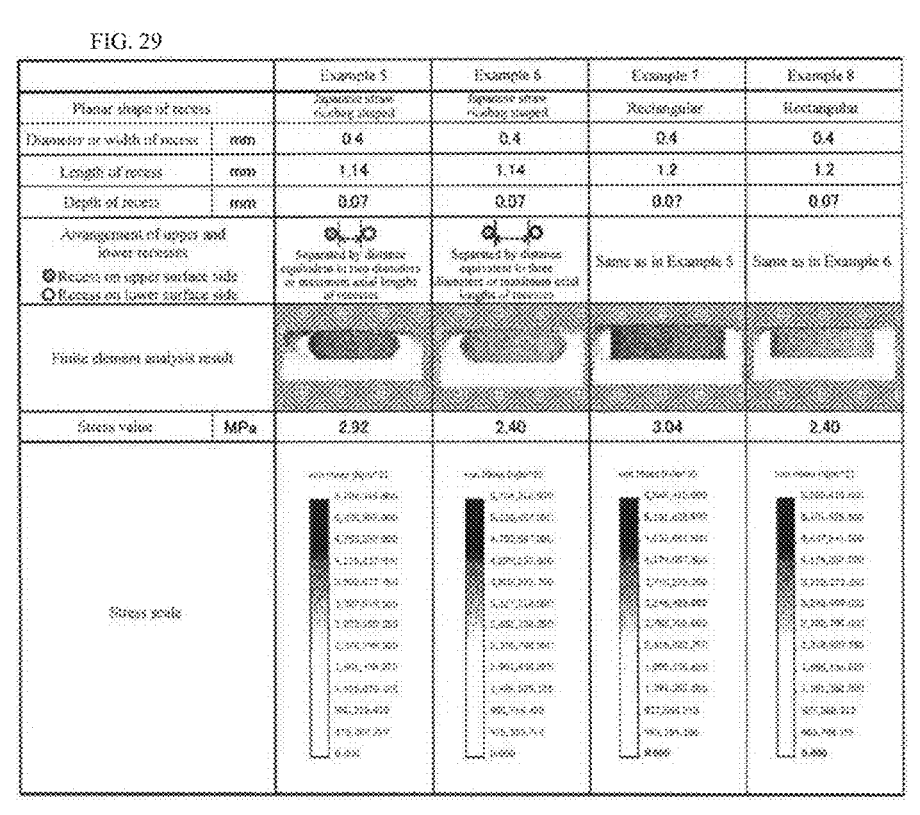

| | Example 5 | Example 6 | Example 7 | Example 8 |
|---|---|---|---|---|
| Planar shape of recess | Squeezed straw cluding shaped | Squeezed straw cluding shaped | Rectangular | Rectangular |
| Diameter or width of recess (mm) | 0.4 | 0.4 | 0.4 | 0.4 |
| Length of recess (mm) | 1.14 | 1.14 | 1.2 | 1.2 |
| Depth of recess (mm) | 0.07 | 0.07 | 0.07 | 0.07 |
| Arrangement of upper and lower recesses ● Recess on upper surface side ○ Recess on lower surface side | Separated by distance equivalent to two diameters or maximum axial lengths of recesses | Separated by distance equivalent to three diameters or maximum axial lengths of recesses | Same as in Example 5 | Same as in Example 6 |
| Finite element analysis result | | | | |
| Stress value (MPa) | 2.92 | 2.40 | 3.04 | 2.40 |
| Stress scale | | | | |

| | | Example 15 | Example 16 | Example 17 | Example 18 | Example 19 |
|---|---|---|---|---|---|---|
| Planar shape of recess | | Japanese screw melon shaped | Rectangular | Rectangular | Rectangular | Rectangular |
| Diameter or width of recess | mm | 0.4 | 0.4 | 0.4 | 0.4 | 0.4 |
| Length of recess | mm | 1.14 | 1.14 | 1.14 | 1.14 | 1.14 |
| Depth of recess | mm | 0.05 | 0.02 | 0.02 | 0.05 | 0.05 |
| Arrangement of upper and lower recesses ○ Recess on upper surface side ○ Recess on lower surface side | | Separated by distance equivalent to one diameter or maximum axial length of recess | Separated by distance equivalent to one fourth diameter or maximum axial length of recess | Same as in Example 15 | Same as in Example 15 | Same as in Example 15 |
| Finite element analysis result | | | | | | |
| Stress value | MPa | 3.30 | 3.70 | 3.24 | 3.34 | 2.70 |
| Stress scale | | | | | | |

INTERDENTAL CLEANING TOOL

TECHNICAL FIELD

The present invention relates to an interdental cleaning tool having a cleaning portion covered with an elastomer.

BACKGROUND ART

There has been commercialized an interdental cleaning tool including a base portion made of a synthetic resin and a soft portion made of an elastomer, in which the base portion includes a handle base portion and a core base portion having an elongated shaft shape provided at a tip end portion of the handle base portion, the soft portion includes at least a cleaning soft portion covering the core base portion, the handle base portion forms a handle portion as a grip, and the core base portion and the cleaning soft portion form a cleaning portion for cleaning a space between teeth (see, e.g., Patent Literatures 1 to 5).

A method widely used to manufacture the interdental cleaning tool includes: filling a synthetic resin material into a first molding space of a first die to form a base portion; placing, in a second molding space of a second die, the base portion molded in the first die; and filling an elastomeric material into the second molding space to form a soft portion in a state of positioning and holding a core base portion at a central part of the second molding space by plural sets of holding pins provided in a first mold and a second mold of the second die at an interval in a length direction (axial direction of the core base portion) of the second molding space, so that the interdental cleaning tool is obtained.

In general, a plurality of interdental cleaning tools are also molded simultaneously by a method that includes: providing a first die having a plurality of first molding spaces and a second die having the same number of second molding spaces as the first molding spaces; in manufacturing the interdental cleaning tools, supplying a synthetic resin material to the first molding spaces to simultaneously form a plurality of base portions so that the plurality of base portions can be connected to one another by a runner portion; placing, in the second molding spaces of the second die, a primary molded product made of the plurality of base portions connected to one another by the runner portion; and then filling an elastomeric material into the plurality of second molding spaces, so that a plurality of interdental cleaning tools are simultaneously formed.

CITATIONS LIST

Patent Literature

Patent Literature 1: Japanese Patent No. 4236571
Patent Literature 2: Japanese Patent No. 3002668
Patent Literature 3: Japanese Translation of PCT International Application Publication No. 2001-506514
Patent Literature 4: Japanese Unexamined Patent Application Publication No. 2013-192866
Patent Literature 5: Japanese Unexamined Patent Application Publication No. 2013-188299

SUMMARY OF INVENTION

Technical Problems

When the cleaning portion is inserted into the interdental space, a large compressive force acts on the axial direction. In addition, when spaces between molars, particularly between large molars are cleaned, it is necessary to insert, into these spaces, a portion from a tip end portion to an intermediate portion of the interdental cleaning tool that is inserted between the molars into an oral cavity in the anterior-posterior direction, while curving the portion from the tip end portion to the intermediate portion by 60° to 90°. Moreover, during interdental cleaning, it is necessary to put the cleaning portion in and out from a gap between the molars in the curved state, so that a large bending load acts on the cleaning portion. For this reason, in the interdental cleaning tool in which the base portion is made of a synthetic resin material, countermeasures against breakage of the cleaning portion at the time of insertion between teeth or during interdental cleaning are one of the important problems.

As one of the countermeasures against the breakage of the cleaning portion, there is also proposed one in which glass fiber is added to the synthetic resin material forming the base portion. When the glass fiber is added by an amount enough to prevent the elongated shaft-shaped cleaning portion from being broken is added, then strength and rigidity of the core base portion in the axial direction of the core is increased. This improves the insertability into an interdental portion. However, a stronger force is required to insert the interdental cleaning tool since the core base portion has difficulty in warping. This causes large bending load be easily act on the core base portion during cleaning spaces between the molars. This has caused such a problem that the core base portion might be broken at an intermediate portion in a length direction thereof or gums might be pierced, upon being used.

On the other hand, when super engineering plastics such as polyether sulfone is adopted as the core base portion, the core base portion becomes easy to warp and the breakage of the cleaning portion can be suppressed. However, for molding of the super engineering plastics, a high injection temperature is essential, and a cooling time after injection molding becomes long. This causes the productivity of the interdental cleaning tool to be lowered, and material cost is also high. This considerably increases total manufacturing cost. There has been such a problem. There has been such a problem.

The inventors of the present invention have found out the following as causes of the breakage of the core base portion. First, a recess is likely to be formed at a position where the holding pin for positioning the core base portion in the second die during molding of the cleaning soft portion and the core base portion are in contact with each other. Second, a cross-sectional area of the core base portion becomes smaller at the position of this recess, and a stress generated by application of bending force to the core base portion becomes higher. Third, a structural change is likely to occur due to the existence of the recess in a region to which such a high stress concentrates, and the core base portion is broken in the vicinity of a shaft position where the recess is formed due to the bending force acting upon insertion of the interdental cleaning tool into the interdental space or during interdental cleaning.

Although a mechanism in which the recess is formed in the core base portion by the holding pin is not clear, it can be presumed that the recess is formed by the following mechanism. That is, the base portion molded by the first die is placed in the second die after being cooled, and in order to shorten a molding time, the base portion is placed in the second die in a relatively high temperature state. In addition, the base portion placed in the second die is softened during molding of the cleaning soft portion since the base portion is exposed to the high temperature elastomer filled in the second molding space. In the second die, the plural sets of holding pins are allowed to protrude into the second molding space by a preset protruding length, and the core base portion is positioned at the central part of the second molding space. Here, variations in molding dimensions of the core base portion may occur due to a molding shrinkage difference by shortening the molding time. The core base portion is exposed to the high temperature elastomer causing thermal expansion thereof, and vibrations of the core base portion at the time of filling the elastomer. It can be presumed that, in this way, the tip end portion of the holding pin bites into the softened core base portion and the recess is formed in the core base portion.

In addition, in a so-called I-type interdental cleaning tool in which a center line of the handle portion and an axis of the core base portion are disposed coaxially with each other, the handle portion is often formed in a flat shape in order to facilitate gripping with fingers. In this case, the handle portion is generally formed to be flat with respect to a mold opening and closing direction of the first die and the second die, and the holding pins are provided so that an axial direction of the holding pins is disposed in the mold opening and closing direction of the second die in order to make a die structure as simple as possible. In view of the above, in the I-type interdental cleaning tool, when the space between the molars is cleaned with the handle portion being gripped, such recesses of the core base portion, which are formed by the holding pins, are arranged on an outer peripheral side of the curved core base portion and an inner peripheral side thereof. The inventors of the present invention have found out that, when this interdental cleaning tool is used in this state, a concentration of a large stress occurs in the vicinity of each of the recesses on both the inner and outer peripheral surfaces of the core base portion, and thereby the core base portion is easily broken at that region.

An object of the present invention is to provide an interdental cleaning tool which has a simple configuration and can effectively prevent the occurrence of the breakage of the core base portion at the time of inserting the interdental cleaning tool into interdental spaces or during interdental cleaning without reducing the productivity of the interdental cleaning tool.

Solutions to Problems

The present invention includes the following inventions.
(Interdental Cleaning Tool)

(1) An interdental cleaning tool, which includes: a base portion made of a synthetic resin; and a soft portion made of an elastomer that covers at least a part of the base portion, the base portion including a handle base portion, and a core base portion that has an elongated shaft-shape connects continuously to a tip end portion of the handle base portion, the soft portion having at least a cleaning soft portion that covers the core base portion, the handle base portion constituting a handle portion serving as a grip, and the core base portion and the cleaning soft portion which constitute a cleaning portion for interdental cleaning, in which a plurality of cleaning portion recesses which penetrate the cleaning soft portion and form recesses in the core base portion are formed on each of a first side portion and a second side portion of the cleaning portion at an interval in an axial direction of the cleaning soft portion, and at least one of the plurality of cleaning portion recesses is formed so that an opening of the core base portion recess formed in the core base portion has a shape elongated in the axial direction of the cleaning portion.

(2) In the interdental cleaning tool according to (1), the opening of the core base portion recess, which is elongated in the axial direction, has an area of 0.15 mm$^2$ or more and 0.6 mm$^2$ or less. In accordance with such an interdental cleaning tool, when the bending force is applied to the cleaning portion at the time of inserting the cleaning portion into the interdental space or during the interdental cleaning by the cleaning portion, it is possible to prevent the breakage of the core base portion due to the occurrence of the concentration of the large stress on the forming position of the core base portion recess. Note that the "maximum depth of the core base portion recess from the outer peripheral surface of the core base portion" means a largest distance among shortest distances from the outer surface to the bottom surface of the opening portion of the core base portion recess. Specifically, a straight line (UL in FIG. 22) is set which connects contact points (points B and T in FIG. 22) of a plane (BS in FIG. 22) passing through a lengthwise center line (CL in FIG. 22) of the core base portion and ends of each of the core base portion recesses to each other, as shown in FIG. 22. Next, a perpendicular line (DL in FIG. 22) drawn to CL from an arbitrary point of UL is set. The length of the straight line (DLa in FIG. 22) is measured which connects the intersection (C1 in FIG. 22) of this DL and the UL and the intersection (C2 in FIG. 22) of this DL and the bottom surface (CS in FIG. 22) of the core base portion recess, to each other. The length of DLa is measured between the point B and the point T (on the straight line UL) while rotating the BS around the CL, and a maximum value of the obtained numerical value DLa is defined as the "maximum depth of the core base portion recess from the outer peripheral surface of the core base portion". In addition, the first side portion and second side portion of the cleaning portion mean one half of an outer peripheral surface of the cleaning portion, which is molded by one of dies, and a remaining half of the outer peripheral surface of the cleaning portion, which is molded by other die, in a second die for molding the cleaning portion.

(3) In the interdental cleaning tool according to (1) or (2), the handle base portion and the core base portion are disposed on substantially the identical axis.

(4) In the interdental cleaning tool according to any one of (1) to (3), an opening area of the core base portion recess elongated in the axial direction is 0.15 mm$^2$ or more and 0.6 mm$^2$ or less, more preferably 0.17 mm$^2$ or more and 0.5 mm$^2$ or less, still more preferably 0.2 mm$^2$ or more and 0.4 mm$^2$ or less. The "opening area of the core base portion recess" means an area where the holding pin and the core base portion are in contact during the molding using the second dies. In the interdental cleaning tool of the present invention, the opening area of the core base portion recess can be confirmed as an area of a portion (CS in FIG. 22) of the core base portion, which is not covered with the soft portion made of the elastomer.

(5) In the interdental cleaning tool according to any one of (1) to (4), a maximum axial length of the core base portion recess elongated in the axial direction is 0.4 mm or more and 1.5 mm or less, more preferably 0.4 mm to 1.3 mm or less, still more preferably 0.5 mm or more and 1.1 mm or less, most preferably 0.6 mm to 1.0 mm or less.

(6) In the interdental cleaning tool according to any one of (1) to (5), at least one set of two cleaning portion recesses among plural sets of the cleaning portion recesses paired between the first side portion and the second side portion are formed at an interval in the axial direction of the cleaning portion so as not to overlap each other in a circumferential direction of the cleaning portion. In accordance with such an interdental cleaning tool, during molding of the cleaning soft portion, the core base portion recesses are formed alternately on the first side portion and second side portion of the core base portion. In this way, the pair of core base portion recesses can be prevented from being formed at the same position in the axial direction of the core base portion. Therefore, the cross-sectional area of the core base portion at each of the positions corresponding to the core base portion recesses can be increased to prevent the core base portion from being broken. In addition, when the holding pins do not overlap each other in the circumferential direction of the second molding space, the holding pins of the first side portion and the second side portion apply a force to different positions of the core base portion, so that vibrations of the core base portion during molding of the soft portion can be suppressed, as compared with the case of the holding pins which overlap each other in the circumferential direction. Therefore, the depth of the formed core base portion recesses becomes shallow, the cross-sectional area of the core base portion at each of the positions corresponding to the core base portion recesses is increased, so that the occurrence of the breakage of the core base portion can be prevented. Furthermore, the interval between the holding pins in the length direction of the core base portion is substantially shortened, thereby holding the core base portion satisfactorily stably. Note that "not overlapping in the circumferential direction" means that two cleaning portion recesses formed by the two holding pins forming a set are in a positional relationship of not overlapping each other even when the cleaning portion recesses are moved in the circumferential direction of the cleaning portion.

(7) In the interdental cleaning tool according to (6), an interval between at least one set of the cleaning portion recesses formed at the interval in the axial direction with respect to the axial direction of the cleaning portion is set to a length of one fourth or more of a maximum axial length of the cleaning portion recesses.

(8) In the interdental cleaning tool according to any one of (1) to (7), the cleaning portion recesses which form the core base portion recesses having the shape elongated in the axial direction are formed individually on the first side portion and second side portion of the cleaning portion, which correspond to a predetermined spot within a range of 5.5 mm to 7.0 mm from the tip end of the core base portion. Note that the "shape elongated in the axial direction" means a shape having a maximum length in a direction of the center line (CL in FIG. 22) of the core base portion or in a spiral direction with respect to the center line of the core base portion, which is longer than a maximum length in a direction of the plane (VS in FIG. 22) perpendicular to the center line of the core base portion. Specifically, the "shape elongated in the axial direction of the cleaning portion" includes such a shape elongated in the spiral direction of the cleaning portion shaft as an elliptical shape, an oblong shape, a rectangular shape, an egg shape, an oval shape/a bale shape (rectangular shape with curved short side portions, rectangular shape with rounded co a teardrop shape, and a parallelogram shape.

(9) in the interdental cleaning tool according to any one of (1) to (8), maximum cross-sectional area of the core base portion at the position corresponding to the core base portion recess elongated in the axial direction is set to 55.0 to 99.6%, more preferably 70.0 to 99.0%, still more preferably 80.0 to 97.9%, most preferably 90.0 to 97.9% with respect to the cross-sectional area of the core base portion at a position adjacent to the core base portion recess. With such a configuration, the concentration of the stress in each of the core base portion recesses can be reduced more effectively, and the core base portion can be far more effectively prevented from being broken. Note that the "cross-sectional area of the core base portion" means an area of a portion where the plane (VS in FIG. 22) perpendicular to the center line (CL FIG. 22) of the core base portion is in contact with the core base portion. Further, the "position adjacent to the core base portion recess" means an intersection position of the axial center line (CL) of the core base portion in FIG. 22 and the plane VS perpendicular to the CL when the plane VS has only one contact point with the end of the core base portion recess. There are two of such "positions adjacent to the core base portion recess" in one core base portion recess. For each cross-sectional area at these two points, a maximum cross-sectional area of the core base portion at a position corresponding to the core base portion recess is calculated. It is necessary for both of the two calculated values to be present within the above range. Further, the "position corresponding to the core base portion recess" means an intersection position of the axial center line (CL) of the core base portion and the plane VS perpendicular to the CL when the plane VS has a contact point with the end of the core base portion recess. That is, a straight line on the CL that connects the above two "positions adjacent to the core base portion recess" corresponds to the two points.

(10) In the interdental cleaning tool according to any one of (1) to (9), the plurality of cleaning portion recesses of the first side portion and the plurality of cleaning portion recesses of the second side portion are formed so as to face each other with the core base portion interposed therebetween, among the core base portion recesses elongated in the axial direction, and the core base portion recesses including other core base portion recesses if the other cleaning portion recesses are present. Here, "to face each other" means that a straight line connecting regions, at which the tip end portions of the paired holding pins contact each other, to each other is located at a position passing near the axis center of the core base portion. The cleaning portion recesses are formed by the holding pins provided in the second die. Therefore, the core base portion can be held satisfactorily stably by the plurality of holding pins with respect to the central part of the second molding space.

(11) In the interdental cleaning tool according to any one of (1) to (10), among cleaning portion recesses having the core base portion recesses elongated in the axial direction, and the cleaning portion recesses including other cleaning portion recesses if the other cleaning portion recesses having other shapes are present, an arrangement interval of the cleaning portion recesses along the axial direction of the cleaning portion is set to be substantially uniform or narrowed as approaching to a tip end side of the cleaning portion. The tip end portion of the cleaning portion is a substantially linear and elongated shaft-shaped structure configured to have a smaller diameter than that of the base end portion, and is liable to structurally change with respect to the force applied by the molding when the cleaning soft portion is molded. Therefore, if the arrangement interval of the cleaning portion recesses is set so as to become narrower as approaching to the tip end side of the cleaning portion or is set to be substantially uniform, it is easy to suppress the core base portion from moving from a predetermined position during molding of the soft portion. In particular, it is the most preferable embodiment that the arrangement interval of the cleaning portion recesses in the axial direction of the cleaning portion is set substantially uniform. Such a configuration is more preferable since external force applied to the core base portion during the molding of the soft portion is likely to be uniform.

(12) in the interdental cleaning tool according to any of (1) to (11), among the core base portion recesses elongated in the axial direction, and the core base portion recesses including other core base portion recesses if the other core base portion recesses having other shapes are present, the opening areas of the plurality of core base portion recesses are set to be substantially identical in size to one another or so that the opening area of the core base portion recess on a most tip end side among the plurality of core base portions becomes smallest. The core base portion is an elongated conical structure, and the cross-sectional area thereof becomes smaller as approaching to the tip end side. Accordingly, it is preferable to set the opening area of the core base portion recess at the tip end portion, where the cross sectional area is the smallest, to be the smallest. In other words, the opening area of the core base portion recess changes in accordance with the tip end portion area of the holding pin holding the core base portion with respect to the central part of the second molding space, so that the tip end portion area of the holding pin located at the most tip end side of the core base portion is substantially identical in size to one another or smallest as compared with the tip end portion areas of the holding pins at the other positions. On the other hand, in the second molding space, with regard to a molding portion for molding the cleaning soft portion, a passage area thereof on the tip end side of the second molding space is narrowed. Accordingly, if the opening area of the core base portion recess on the most tip end side is set to be as small as possible, that is, the tip end portion area of the holding pin on the tip end side is reduced, then a passage area of the second molding space is made as large as possible. Therefore, a flow resistance of the elastomeric material can be set as small as possible. In addition, the influence of the Karman vortex, which is generated in the vicinity of each holding pin, on the molded product and the holding pin can be further suppressed, thereby improving the holding of the core base portion, and preventing poor filling of the elastomeric material with respect to the cleaning soft portion molding portion.

(13) In the interdental cleaning tool according to any one of (1) to (12), the handle base portion and the core base portion are disposed on substantially the identical axis. When the handle base portion and the core base portion are disposed on substantially the identical axis, a plurality of the interdental cleaning tools can be molded to be closely arranged side by side in parallel, and the number of the interdental cleaning tools to be taken can be increased. Accordingly, this is preferable.

(14) In the interdental cleaning tool according to any one of (1) to (13), the base portion is made of a thermoplastic synthetic resin material having crystallinity in which a melting point is 150° C. or more. When the base portion is molded using the thermoplastic synthetic resin material having such a melting point, a molding time of the base portion, particularly a cooling time thereof, can be reduced, thereby, increasing the production efficiency. With this the productivity of the interdental cleaning tool can be improved, and eventually, manufacturing cost of the interdental cleaning tool can be reduced.

(Method for Manufacturing Interdental Cleaning Tool)

(15) Provided is a method for manufacturing an interdental cleaning tool that includes: a base portion made of a synthetic resin; and a soft portion made of an elastomer that covers at least a part of the base portion, the base portion including a handle base portion and a core base portion having an elongated shaft-shape connecting continuously to a tip end portion of the handle base portion, the soft portion having at least a cleaning soft portion that covers the core base portion, the handle base portion constituting a handle portion serving as a grip, and the core base portion and the cleaning soft portion constituting a cleaning portion for interdental cleaning, the method including: a base portion molding step of supplying a synthetic resin material into a first molding space of a first die to form a base portion; and a soft portion molding step of placing the base portion molded in the base portion molding step in a second molding space of a second die for molding the soft portion, holding the core base portion on a substantially central part of a cleaning soft portion molding portion so that core base portion recesses are formed in the core base portion by a plurality of holding pins, at least one of which has a cross section formed into a shape elongated in the length direction of the second molding space, the plurality of holding pins being individually provided at intervals in the length direction of the second molding space in a first mold and second mold of the second die, and filling the second molding space with an elastomeric material to mold the soft portion in a state of holding the core base portion on the substantially central part of the cleaning soft portion molding portion.

(16) in the method for manufacturing an interdental cleaning tool according to (15), a cross-sectional area of the holding pins elongated in the length direction of the second molding space is set to 0.15 mm$^2$ or more and 0.6 mm$^2$ or less, more preferably 0.17 mm$^2$ or more and 0.5 mm$^2$ or less, still more preferably 0.2 mm$^2$ or more and 0.40 mm$^2$ or less.

(17) In the method for manufacturing an interdental cleaning tool according to (15) or (16), the cross sections of the holding pins elongated in the length direction of the second molding space has a maximum length along the length direction of the second molding space, which is set to 0.4 mm or more and 1.5 mm or less, more preferably 0.4 mm or more and 1.3 mm or less, still more preferably 0.5 mm or more and 1.1 mm or less, most preferably 0.6 mm or more and 1.0 mm or less.

(18) In the method for manufacturing an interdental cleaning tool according to any one of (15) to (17), the holding pins having the shape elongated in the length direction of the second molding space are individually formed in the first mold and second mold of the second die so as to correspond to predetermined spots within a range of 5.5 mm to 7.0 mm from the tip end of the core base portion.

(19) In the method for manufacturing an interdental cleaning tool according to any one of (15) to (18), three or more holding pins are provided in at least either one of the first mold and second mold of the second die, among the holding pins having the shape elongated in the length direction of the second molding space and other holding pins if the other holding pins are present. With such a configuration, three or more cleaning portion recesses are formed on at least one of the first side portion and second side portion of the cleaning portion by the holding pins. Accordingly, in the interdental cleaning tool manufactured by this manufacturing method, unevenly distributed portions of stress caused by the bending force acting on the cleaning portion at the time of the interdental insertion or during the interdental cleaning can be dispersed at three or more positions of the cleaning portion, at which the cleaning portion recesses are formed, and the breakage of the core base portion due to the local application of a large bending force can be prevented effectively. Moreover, when three or more holding pins are provided, a total contact area of the holding pins with respect to the core base portion is increased and the vibrations of the core base portion can be suppressed more surely. Accordingly, it is easy to perform control to make the depth of the core base portion recesses shallow. Therefore, the depth of the core base portion recesses can be made shallower, so that the occurrence of such stress concentration at the positions of the core base portion recesses at the time of the interdental cleaning can be prevented more surely. It should be noted that the number of the holding pins of the first mold and the second mold in the second die can be the same or different.

(20) In the method for manufacturing an interdental cleaning tool according to any one of (15) to (19), arrangement intervals of the holding pins in the length direction of the second molding space are substantially identical, among the holding pins having the shape elongated in the length direction of the second molding space and other holding pins if the other holding pins are present.

(21) In the method for manufacturing an interdental cleaning tool according to any one of (15) to (19), arrangement intervals of the holding pins in the length direction of the second molding space are made narrower as approaching to the tip end side of the second molding space, among the holding pins having the shape elongated in the length direction of the second molding space and other holding pins if the other holding pins are present.

(22) In the method for manufacturing an interdental cleaning tool according to any one of (15) to (21), among the holding pins having the shape elongated in the length direction of the second molding space and other holding pins if the other holding pins are present, an area of a tip end portion of the holding pin located on a most tip end portion of the cleaning portion is set to be substantially identical in size to one another as or smaller than areas of tip end portions of the holding pins at other positions. The core base portion has a shape that contracts continuously or stepwise, and a thickness of the cleaning soft portion is substantially constant within a range of about 0.1 mm to 0.2 mm. Accordingly, the passage area of the second molding space for molding the cleaning soft portion decreases as approaching to the tip end side. Therefore, the area of the tip end portion of the holding pin located at the most tip end portion of the cleaning portion is reduced, whereby the passage area can be set as large as possible. This setting allows the flow resistance of the elastomeric material to be set as small as possible. In addition, the influence of the Karman vortex, which is generated in the vicinity of each holding pin, on the molded product and the holding pin, can be further suppressed. Then, the holding of the core base portion can be improved, and the poor filling of the elastomeric material with respect to the cleaning soft portion molding portion can be prevented.

(23) In the method for manufacturing an interdental cleaning tool according to any one of (15) to (22), the elastomeric material is filled from the tip end side of the second molding space.

(24) In the method for manufacturing an interdental cleaning tool according to any one of (15) to (22), the elastomeric material is filled from the base end side of the second molding space.

(25) In the method for manufacturing an interdental cleaning tool according to any one of (15) to (24), a specific or all the holding pins of the first mold in the second die and the corresponding holding pins of the second mold are arranged at intervals in the length direction of the second molding space so as not to overlap each other in the circumferential direction of the second molding space, among the holding pins having the shape elongated in the length direction of the second molding space and holding pins having other shapes if the holding pins having the other shapes are present. With such a configuration, the holding pins of the first side portion and the second side portion can apply forces to different positions in the axial direction of the core base portion. Accordingly, a vibratory motion of the core base portion during molding of the soft portion can be suppressed, as compared with the case where the holding pins are arranged to face each other. This vibratory motion is suppressed, thereby allowing the depth of the core base portion recess formed during the molding of the soft portion to be made shallower. Accordingly, the occurrence of the stress concentration on the core base portion recess at the time of the interdental cleaning can be suppressed, and the occurrence of the breakage of the core base portion can be prevented. Furthermore, the interval between the holding pins in the length direction of the core base portion becomes substantially uniform or narrower as approaching to the tip end side of the core base portion. Accordingly, it is possible to hold the core base portion satisfactorily stably. It should be noted that the holding pin of the second mold, which corresponds to the holding pin of the first mold, means a holding pin in the same order counted from the tip end of the second molding space. In addition, "not overlapping in the circumferential direction of the second molding space" means that two holding pins making a set are in a positional relationship of not colliding with each other even when the cleaning portion recesses of the holding pins are moved in the circumferential direction of the second molding space. It is preferable that an interval between at least one set of the holding pins arranged at an interval in the length direction of the second molding space with respect to the length direction of the second molding space is set to a length of not less than one fourth of a maximum axial length of the holding pins. It should be noted that "arranging the holding pins to face each other" means that a pin tip position of the holding pin of the first side portion and a pin tip position of the holding pin of the second side portion overlap each other in the center line direction (the direction of DL in FIG. 22) of the core base portion. In other words, a perpendicular line (DL in FIG. 22) is first set, which is drawn to the center line (CL in FIG. 22) in the length direction of the core base portion from an arbitrary point of a straight line (UL in FIG. 22) that connects contact points (points B and T in FIG. 22) of a plane (BS in FIG. 22) passing through the CL and ends of the core base portion recess to each other. The "arranging the holding pins to face each other" means that the DL of the core base portion recess of the first side portion and the DL of the second recess are in a relationship of partially or entirely overlapping each other, in this case.

(26) In the method for manufacturing an interdental cleaning tool according to any one of (15) to (25), at least one set of the holding pins out of plural sets of the holding pins paired with each other between the first mold and the second mold in the second die has a central segment of the at least one set of holding pins is formed with an angle in the circumferential direction of the second molding space with respect to a mold opening and closing direction of the second die, among the holding pins having the shape elongated in the length direction of the second molding space and holding pins having other shapes if the holding pins having the other shapes are present. With such a configuration, the degree of freedom in the arrangement layout when the protrusions are provided in the cleaning soft portion can be improved. In other words, the soft portion is molded in a state where the core base portion is held in the central part of the second molding space by the plurality of holding pins. The positions of the holding pins can be adjusted in the length direction and the circumferential direction with respect to the second molding space so that the holding pins do not interfere with the forming positions of the cleaning protrusions. Accordingly, the degree of freedom in the arrangement layout of the cleaning protrusions can be improved. Note that "forming the central segment of the holding pin with an angle in the circumferential direction of the second molding space with respect to the mold opening and closing direction of the second die" means that the holding pins of the first side portion and the second side portion are not in such a relationship of being arranged to face each other. That is, the above-described phrase means that the DL of the core base portion recess of the first side portion and the DL of the second recess never overlap each other when the perpendicular line (DL in FIG. 22) is set, which is drawn to the center line (CL in FIG. 22) in the length direction of the core base portion from an arbitrary point of the straight line (UT in FIG. 22) that connects the contact points (points B and T in FIG. 22) of the plane (BS in FIG. 22) passing through the CL and the ends of the core base portion recess to each other.

(27) in the method for manufacturing an interdental cleaning tool according to any one of (15) to (26), at least either one of a fibrous material and talc is added to the synthetic resin material constituting the base portion. With such a configuration, the strength and rigidity of the core base portion against the bending force can be enhanced. Moreover, since the rigidity of the core base portion can be increased, the holding pin can be further suppressed from biting into the core base portion, the depth of the core base portion recess formed in the core base portion is hardly deepened. This is also preferable in preventing the occurrence of the stress concentration at the position where the core base portion recess is provided.

(28) In the method for manufacturing an interdental cleaning tool according to any one of (15) to (27), the cross section of the holding pin having the shape elongated in the length direction of the second molding space, and an opening shape of the core base portion recess elongated in the axial direction and formed by the holding pin have such a shape elongated in a spiral direction of the cleaning portion shaft, as an elliptical shape, an oblong shape, a rectangular shape, an egg shape, an oval shape and a bale shape (rectangular shape with curved short side portions, rectangular shape with rounded corners), a teardrop shape, and a parallelogram shape.

Advantageous Effects of Invention

In accordance with the interdental cleaning tool according to the present invention and the method for manufacturing the same, the opening shape is configured to be elongated in the axial direction of the cleaning portion. Accordingly, the width of the core base portion recess along the circumferential direction of the cleaning portion of the cleaning portion recess is avoided from being increased, thereby improving the degree of freedom in design of the arrangement layout of the protrusions when the protrusions are provided in the cleaning soft portion. In addition, the holding pins of the first side portion and the second side portion with respect to the core base portion can apply forces to different positions in the axial direction of the core base portion. Accordingly, a vibratory motion of the core base portion during the molding of the soft portion can be suppressed, as compared with the case where the holding pins are arranged to face each other. This vibratory motion is suppressed, thereby allowing the depth of the core base portion recess formed during the molding of the soft portion to be made shallower. Accordingly, the occurrence of the stress concentration on the core base portion recess at the time of the interdental cleaning can be suppressed, and the occurrence of the breakage of the core base portion can be prevented.

BRIEF DESCRIPTION OF DRAWINGS

FIG. 2(a) is a front view of the interdental cleaning tool connected body, and FIG. 2(b) is a side view thereof.

FIGS. 25(a), 25(b) and 25(c) are explanatory views showing a state in which the core base portion is supported by a holding pin having a hollow at a tip end portion thereof.

FIG. 27 shows analysis results and the maximum stress values.

FIG. 29 shows analysis results and the maximum stress values.

FIG. 30 shows analysis results and the maximum stress values.

FIG. 31 shows analysis results and the maximum stress values.

DESCRIPTION OF EMBODIMENTS

Hereinafter, embodiments of the present invention will be described with reference to the drawings.

<Interdental Cleaning Tool>

An interdental cleaning tool of the present invention includes a base portion made of a synthetic resin and a soft portion made of an elastomer.

Examples of synthetic resin materials that can be used to form the base portion include thermoplastic synthetic resin materials, such as polypropylene (PP), polybutylene terephthalate (PBT), polyethylene, polyethylene terephthalate, polycyclohexylene dimethylene terephthalate, saturated polyester resins, polymethyl methacrylate, cellulose propionate, polyurethane, polyamide, polycarbonate, acrylonitrile butadiene styrene (ABS), and. In addition, as a synthetic resin material constituting the base portion, it is preferable to adopt a thermoplastic synthetic resin material having crystallinity citing point of 150° C. or more in order to improve the productivity. In particular, polypropylene (PP), polybutylene terephthalate (PBT), and polyamide (PA) are preferred, which can prevent a base portion 10 from be broken. Polypropylene is most preferred, which can be molded at low temperatures, can reduce cycle time and improve the productivity, and imposes less heat load on molding equipment.

For the synthetic resin material constituting the base portion, in order to prevent breakage of a cleaning portion at the time of insertion into the interdental space or during interdental cleaning, powders such as plate-like or granular glass flakes, mica and talc, and fibrous materials such as glass fibers, carbon fibers and aramid fibers can be added.

Examples of the elastomer that can be used to form the soft portion include thermoplastic elastomers such as styrene elastomers, olefin elastomers, and polyamide elastomers, and thermosetting elastomers such as silicone rubbers, urethane rubbers, fluoro rubbers, natural rubbers, and synthetic rubbers. Particularly preferred are materials having compatibility with the synthetic resin material constituting the base portion. For example, when the base portion is made of polypropylene, the soft portion should preferably be made of a polyolefin-based elastomer or a styrene-based elastomer. As the elastomer, one to which an additive is added can also be adopted.

Next, a specific shape of an interdental cleaning tool 1 will be described with reference to the drawings.

Figure 1:
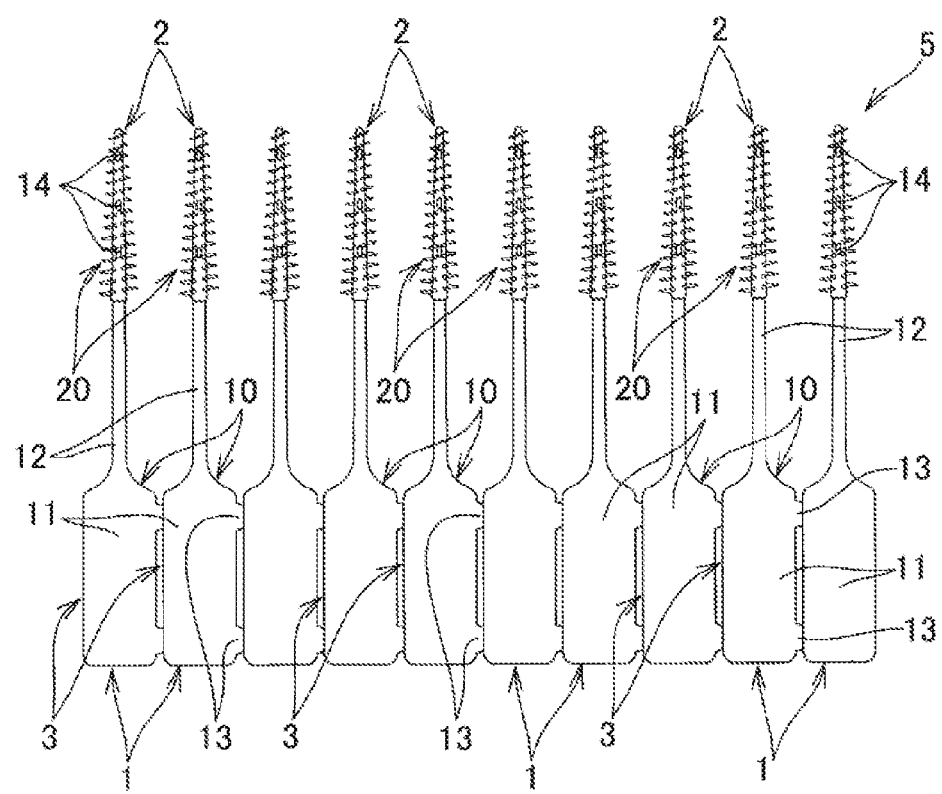
FIG. 1 is a front view of an interdental cleaning tool connected body.
Figure 3:
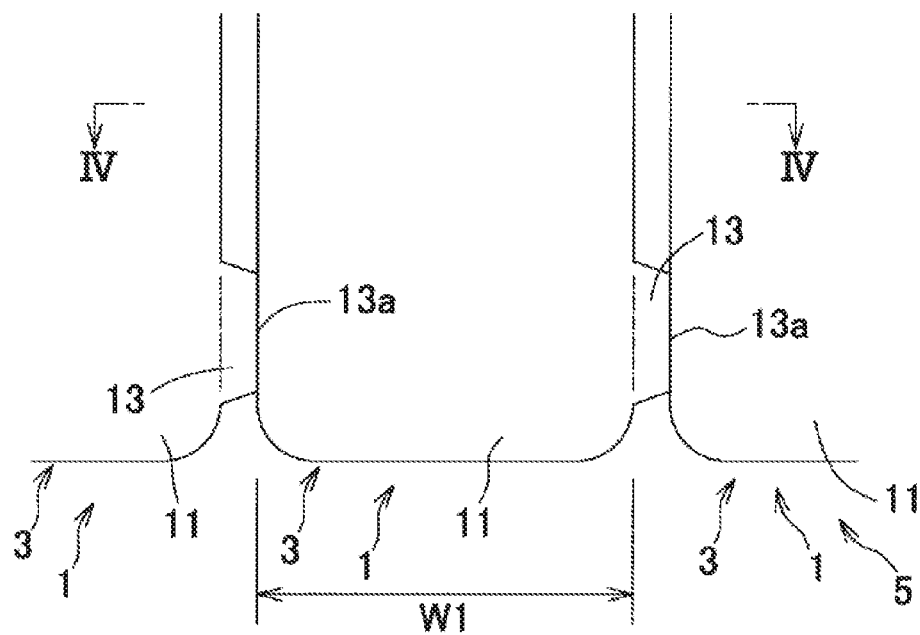
FIG. 3 is an enlarged front view of a vicinity of a connecting portion of the interdental cleaning tool connected body.
Figure 4:
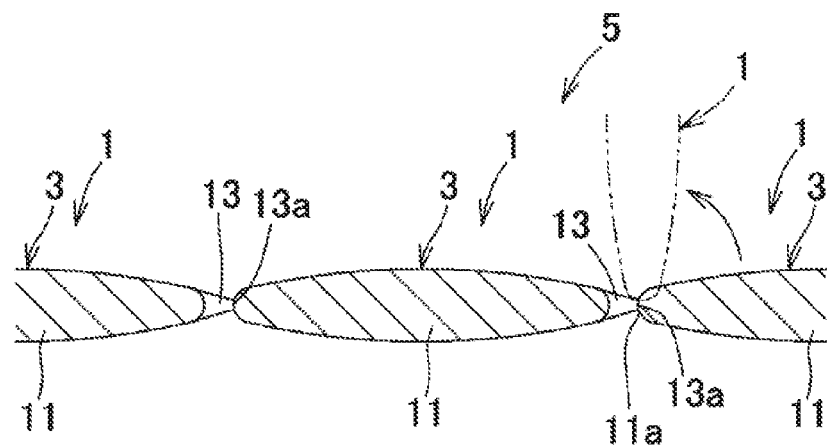
FIG. 4 is a cross-sectional view taken along line IV-IV of FIG. 3.

As shown in FIG. 1, FIG. 2A, FIG. 2B, FIG. 3, FIG. 4, FIG. 5A, FIG. 5B and FIG. 6, the interdental cleaning tool 1 includes a cleaning portion 2 for interdental cleaning and a handle portion 3 as a grip, which are distinguishable in terms of function, and also includes the base portion 10 made of a synthetic resin and a soft portion 20 made of an elastomer, which are distinguishable in terms of material. As shown in FIG. 1, FIG. 2A, FIG. 2B and FIG. 3, such interdental cleaning tools 1 are manufactured in the form of an interdental cleaning tool connected body 5, which includes a plurality of interdental cleaning tools 1 separably connected in parallel to one another. A user disconnects the interdental cleaning tools 1 one by one at connecting portions 13 from one side of the interdental cleaning tool connected body 5, so as to sequentially use them. Although FIG. 1 illustrates that ten interdental cleaning tools 1 are connected in parallel to form the interdental cleaning tool connected body 5, any number of interdental cleaning tools 1 may be connected.

(Base Portion)

The base portion 10 is made of a thermoplastic synthetic resin. As shown in FIG. 1, FIG. 2A, FIG. 2B, FIG. 3, FIG. 4, FIG. 5A, FIG. 5B and FIG. 6, the base portion 10 includes: a handle base portion 11 that has a flat elongated plate shape and forms the handle portion 3: a core base portion 12 that is connected to a tip end portion of the handle base portion 11 and has an elongated shaft shape; and the connecting portions 13 separably connecting the adjacent handle base portions 11.

The handle base portion 11 is formed in a flat elongated plate shape. However, the handle base portion 11 may have any shape other than the flat elongated plate shape as long as the shape facilitates gripping by fingers and interdental cleaning. For example, the handle base portion 11 can be formed into a rod shape, a plate shape, or a continuous or stepwise curved shape, in which a cross-sectional shape is formed to be a circular shape, an oval shape (an elliptical shape, an oblong shape, a rounded rectangular shape, an egg shape, an oval shape (Japanese old coin shape), a bale shape (rectangular shape with curved short side portions, rectangular shape with rounded corners), etc.), a teardrop shape and a polygonal shape. The handle base portion 11 may be provided with a curved portion or a recess for improving ease of holding. The tip end portion of the handle base portion 11 becomes narrower in width as approaching to the core base portion 12 side, and is smoothly connected to the core base portion 12. The handle base portion 11 may have any dimensions capable of facilitating the gripping by fingers and the interdental cleaning. For example, the handle base portion 11 illustrated in FIG. 1, FIG. 2A and FIG. 2B has a length L1 of 10 mm to 25 mm, a width W1 of 4 mm to 8 mm, and a gripping portion thickness t1 of 1.0 mm to 2.0 mm. In this manner, since the handle base portion 11 is made thin, there is less unevenness in dimension due to shrinkage of the handle base portion 11 when molding the base portion 10. In addition, occurrence of sink marks is prevented, and loading defects of the base portion 10 into second dies 40 and 41 for molding the soft portion 20 can be prevented.

The core base portion 12 is formed in a substantially linear elongated shaft shape, and the handle base portion 11 and the core base portion 12 are disposed substantially in the identical axis line, and the core base portion 12 and the handle base portion 11 are disposed in the identical plane. An exposed portion 12a exposed to the outside is formed on a gripping portion side of the core base portion 12. A core main body 12b which is covered with an elastomer and is insertable between the teeth is formed at a tip end side portion of the core base portion 12. At least a portion of the core main body 12b, which is covered with the soft portion of the core base portion 12, is formed in a gentle tapered shape to decrease in diameter as approaching to the tip end side. In addition, the portion which is not covered with the soft portion may not necessarily be linear, and for example, a shape bent continuously or stepwise may be adopted.

In view of operability, a length L2 of the exposed portion 12a of the core base portion 12 from an end point of a round portion (curved portion) on a side surface of the tip end portion of the handle base portion 11, which is configured to be narrow, to a base end portion of a covering portion 21a of the soft portion 20 is set to be, for example, 10 mm to 40 mm, preferably 10 mm to 30 mm, more preferably 10 mm to 25 mm, most preferably 10 mm to 20 mm. In view of interdental cleaning performance, a length L3 of a cleaning soft portion 21 is set to be, for example, 12 mm to 22 mm. From viewpoints of insertability and relaxation of stress concentration, a cross-sectional shape of the core base portion 12 is preferably circular, but may be a cross-sectional shape such as an oval shape, a teardrop shape or a polygonal shape.

In view of such insertability into the space between the teeth, the tapered shape of the outer surface of the core base portion 12 makes an angle θ1 of 0.2° to 1.5° with a center line of the core base portion 12. The tip end portion of the core main body 12b has a diameter of 0.4 mm to 0.6 mm. The base end portion of the core main body 12b has a diameter of 0.8 mm to 2.0 mm. A curved surface end portion of the tip end portion of the covering portion 21a of the cleaning soft portion 21 has a diameter D of 0.5 to 1.2 mm. The core main body 12b is so formed that the tip end portion with a length by at least 5 mm from the tip end is reliably insertable between the teeth.

In this case, the angle θ1 of the tapered shape of the core base portion 12 is constant over the entire length of the core base portion 12. Alternatively, the angle θ1 may also be continuously or stepwise reduced toward the tip end side of the core base portion 12. In addition, the exposed portion 12a may be formed in a shaft shape with a constant diameter over its entire length, and only the core main body 12b may be gently tapered to decrease in diameter as approaching to the tip end side. Alternatively, the exposed portion 12a may also be omitted, and the core main body 12b may be connected directly to the handle base portion 11.

In the present embodiment, the present invention is applied to the I-type interdental cleaning tool 1 in which the handle base portion 11 and the core base portion 12 are disposed substantially in the identical axial line. The present invention can also be applied to a so-called L-shaped interdental cleaning tool 1 that includes the core base portion 12 a center line of which is inclined at an angle of, for example, 120° with respect to a center line of the handle base portion 11, and to a curve-shaped interdental cleaning tool in which a handle portion connected to a cleaning portion has a smooth curved shape of about 140° to 160°.

As shown in FIG. 2A, FIG. 2B, FIG. 3 and FIG. 4, each of the connecting portions 13 between the adjacent handle base portions 11 is integrally formed with the handle base portions 11. A pair of the connecting portions 13 are provided at the base end portion side and the tip end portion side of each of the handle base portions 11 with a certain spacing therebetween in the length direction. The connecting portions 13 are elongated in the length direction of the handle base portion 11, and are formed into a trapezoidal shape (isosceles trapezoidal shape in FIG. 3) in front view. The number of the connecting portions 13 can be arbitrarily set, and only one can be provided. However, with such a configuration, when the interdental cleaning tool 1 is manufactured, connecting strength of the adjacent base portions 10 cannot be sufficiently ensured. Then, when the mold is opened after the molding of the base portions 10, the connecting portions 13 are ruptured, the base portions 10 may be broken, and the soft portions 20 cannot be molded. In addition, the connecting portions 13 may be bent, and the base portions 10 cannot be loaded in an appropriate position of a second molding space 42 (see FIG. 6) for molding the soft portions 20, and molding defects may occur. Therefore, two or more of the connecting portions 13 are preferably provided at intervals in the length direction of the handle base portion 11.

The connecting portions 13 are configured in the following manner. A cross section of the connecting portions 13 is formed in a trapezoidal shape or a triangular shape (isosceles trapezoidal shape or isosceles triangular shape in FIG. 4). Then, as shown by a virtual line in FIG. 4, bending force is concentrated on boundary portions 13a by allowing the interdental cleaning tool 1 to pivot in such a direction that the interdental cleaning tools 1 adjacent to each other overlap each other, around the boundary portions 13a. In addition, each circular-arc side surface 11a on a side edge of the handle base portion 11 comes into contact with the outer surfaces of the connecting portions 13. In this way, large force in a direction to pull apart the side surface 11a from the boundary portion 13a is applied by the lever principle. As described above, the interdental cleaning tool 1 can be completely separated at the boundary portions 13a without large deformation of the connecting portion 13. Here, the shape of the connecting portions 13 can be formed arbitrarily as long as the connecting portions 13 are configured to be capable of easily and completely separating the interdental cleaning tools 1 from each other by allowing the interdental cleaning tool 1 to pivot in such a direction that the interdental cleaning tools 1 adjacent to each other overlap each other, around the connecting portions 13.

When fibrous materials are added to the synthetic resin material constituting the base portions 10, the length direction of the fibrous materials is preferably oriented in a direction along the length direction of the base portion 10. This configuration makes it possible to improve the bending strength or axial buckling strength of the base portion 10 and to effectively prevent the core base portion 12 from breakage or buckling during use of the interdental cleaning tool 1. Further, by adding the fibrous materials as described above and powders such as plate-like or granular glass flakes, mica and talc, a biting amount of a holding pin which bites into the core base portion 12 can be reduced, and a recess 14a of the formed core base portion 12 can be made shallow.

(Soft Portion)

As shown in FIG. 1, FIG. 2A, FIG. 2B, FIG. 3, FIG. 4, FIG. 5A, FIG. 5B and FIG. 6, the soft portion 20 is molded so as to be integrated with the base portion 10 using an elastomeric material, and includes the cleaning soft portion 21 externally mounted on the core base portion 12. Here, for the soft portion 20, it is possible to provide an insertion restriction portion having an annular shape for restricting the interdental insertion at the base end portion of the core main body 12b, or to provide a non-slip portion in which all or a part of the surface of the handle base portion 11 is covered with an elastomer. Although it is also possible to mold the insertion restriction portion and the non-slip portion independently of the cleaning soft portion 21, it is preferable to form the insertion restriction portion and the non-slip portion so as to be continuous with the base portion of the cleaning soft portion 21 since a structure of the dies becomes complicated.

The cleaning soft portion 21 includes the covering portion 21a with which the core base portion 12 is covered and a plurality of cleaning protrusions 21b protruding outward from the covering portion 21a at intervals in the length direction.

If a thickness of the covering portion 21a is too large, it is necessary to reduce a diameter of the core main body 12b covered with the covering portion 21a. This undesirably reduces the rigidity of the cleaning portion 2 significantly during the insertion between teeth, and raises the possibility of occurrence of Karman vortex at the time of molding the cleaning soft portion 21, which causes the cleaning portion 2 to be subject to a significant influence of the Karman vortex. If the thickness of the covering portion 21a is too small, the elastomeric material cannot be filled up to the base end portion of the cleaning portion 2 undesirably. Therefore, the thickness of the covering portion 21a is preferably set at 0.1 mm to 0.2 mm.

The cleaning protrusions 21b are formed apart from one another in the length direction of the covering portion 21a, and are also arranged at intervals from one another in the circumferential direction of the covering portion 21a. More specifically, in order to make it possible to mold the cleaning protrusions 21b with the second dies 40 and 41 which are described later, in the circumferential direction of the covering portion 21a, totally six types of the cleaning protrusions 21b are arranged at intervals from one another in the length direction of the covering portion 21a. The six types include: which are: a set of the two cleaning protrusions 21b protruding from the covering portion 21a to one side in the mold opening and closing direction; a set of the two cleaning protrusions 21b protruding from the covering portion 21a to the other side in the mold opening and closing direction; one cleaning protrusion 21b protruding to one side along mating surfaces 40a and 41a from the covering portion 21a; and one cleaning protrusion 21b protruding to the other side along the mating surfaces 40a and 41a from the covering portion 21a. Here, it is also possible to form the cleaning protrusions 21b in an arrangement pattern other than the above-described one. For example, it is also possible to provide a set of four cleaning protrusions 21b protruding outward from the covering portion 21a in a cross shape, at intervals in the axial direction.

A cross-sectional area, length, number, and arrangement interval of the base end portion of the cleaning protrusions 21b can be arbitrarily set, but in view of moldability and cleaning performance, the cross-sectional area of the base end portion of the cleaning protrusion 21b is preferably set to 0.03 mm$^2$ to 1.5 mm$^2$, more preferably 0.03 mm$^2$ to 1.0 mm$^2$, and most preferably 0.04 mm$^2$ to 0.8 mm$^2$. The length of the cleaning protrusions 21b is preferably set to 0.1 mm to 2.5 mm, more preferably 0.3 mm to 2.0 mm, and most preferably 0.5 mm to 1.7 mm. The number of the cleaning protrusions 21b is preferably set to 20 to 100, and the arrangement interval of the cleaning protrusion 21b is preferably set to 0.5 mm to 1.5 mm. In addition, although conical protrusions are adopted as the cleaning protrusions 21b, protrusions having a tapered axially flat plate shape can also be adopted. Further, as the cross-sectional shape of the cleaning protrusions 21b, an arbitrary sectional shape such as an oval shape, a teardrop shape and a polygonal shape can be adopted, in addition to the circular shape.

When the soft portion 20 is molded, in order to position and hold the core base portion 12 within the central part of the second molding space 42 with a plurality of holding pins provided in the second dies 40 and 41, as described later, cleaning portion recesses 14 which penetrate the covering portion 21a and form core base portion recesses 14a in the core base portion 12 are formed at positions corresponding to the holding pins, in the cleaning portion 2 of the interdental cleaning tool 1. The core base portion recesses 14a are formed such that the base portion 10 with relatively high temperature immediately after being molded by first dies 30 and 31 is softened by exposure to heat of the elastomer filled in the second dies 40 and 41, and that tip end portions of the holding pins abut against the softened core base portion 12.

Figure 6:
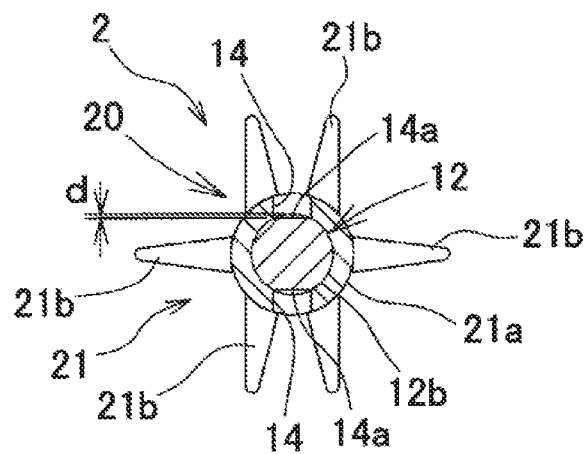
FIG. 6 is a cross-sectional view taken along line VI-VI of FIG. 5(a).

As shown in FIG. 6, a maximum depth d of each of the core base portion recesses 14a from an outer peripheral surface of the core base portion 12 is set to 0.03 mm or less, preferably 0.01 mm or more and 0.02 mm or less in order to prevent the core base portion 12 from being broken due to an occurrence of a concentration of a large stress at the forming position of the core base portion recess 14a when bending force is applied to the cleaning portion 2 at the time of inserting the cleaning portion 2 into the interdental space or during interdental cleaning by the cleaning portion 2. Note that the depth of the core base portion recess means a degree of deformation (distance within which the core base portion is compressed and deformed) of the core base portion, the deformation being caused by the fact that the holding pins abut against the core base portion during molding in the second die. With respect to the cross-sectional area of the core base portion 12 at a position adjacent to the core base portion recess 14a, a maximum cross-sectional area of the core base portion 12 at the position corresponding to the core base portion recess 14a is preferably set to 55.0 to 99.6%, more preferably 70.0 to 99.0%, further more preferably 80.0 to 97.9%, and most preferably 90.0 to 97.9%. With such a configuration, the stress concentration in each of the core base portion recesses 14a during use is reduced, and the breakage of the core base portion 12 at the time of the insertion into the interdental space or during the interdental cleaning can be prevented far more effectively.

Figure 7:
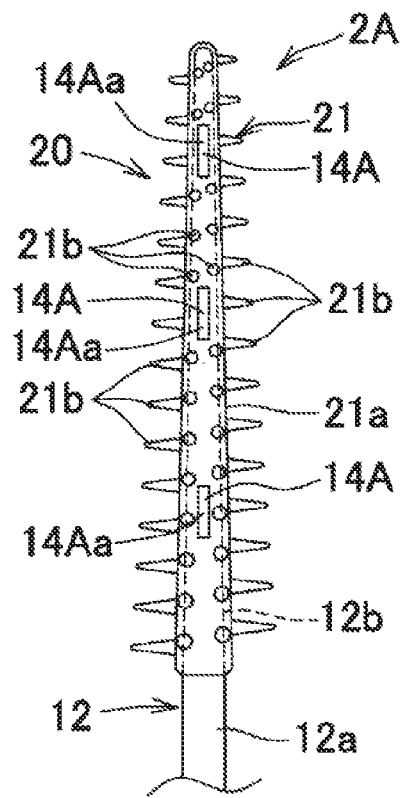
FIG. 7 is an enlarged front view of a cleaning portion of another configuration.

A front of the cleaning portion recess 14 has a shape elongated in the axial direction of the cleaning portion. In each of the examples of FIG. 1, FIG. 2A, FIG. 2B, FIG. 3, FIG. 4, FIG. 5A, FIG. 5B and FIG. 6, a pin tip shape of the holding pin is formed into a bale shape (rectangular shape with curved short side portions, rectangular shape with rounded corners), whereby the cleaning portion recess 14 having substantially the same shape is formed between cleaning protrusions 21b adjacent to one another in the circumferential direction so that a longitudinal direction thereof can coincide with the axial direction of the cleaning portion 2. Besides the bale shape (rectangular shape with curved short side portions, rectangular shape with rounded corners), for example, it is possible to adopt a rectangular shape shown in FIG. 7, an elliptical shape, or other shapes. All of the plurality of cleaning portion recesses 14 provided in the interdental cleaning tool 1 can be formed in the same shape as in this embodiment, or those in different shapes according to distances from the tip end portion of the cleaning portion 2 can also be arbitrarily combined and mixed with one another. It is preferable to provide the recesses 14 having the above shape with a depth of 0.03 mm or less, which are shown in this embodiment, at least at a predetermined spot within a range of 5.5 mm to 7.0 mm from the tip end of the core base portion. In this embodiment, such spots become the recesses 14 having the core base portion recesses 14a formed by intermediate portion holding pins 51. These spots may be broken at the time of use, due to the stress concentrated in the recesses 14 at these spots. Therefore, it is preferable to form the recesses 14 having the above shape at this spot.

Figure 23:
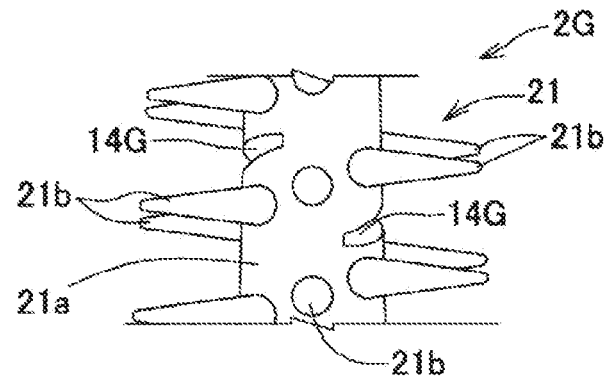
FIG. 23(a) is a front view of a cleaning portion of another configuration.
FIG. 23(b) is a side view thereof.
FIG. 23(c) is a cross-sectional view thereof.
Figure 23B:
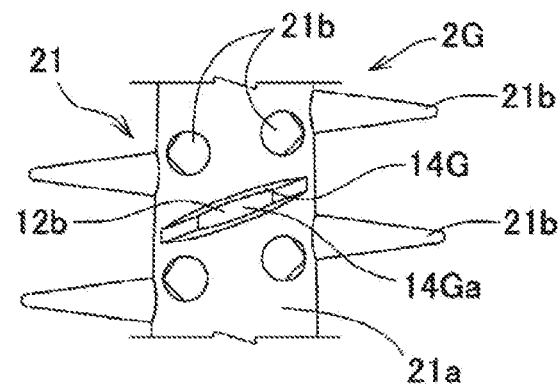
Figure 23C:
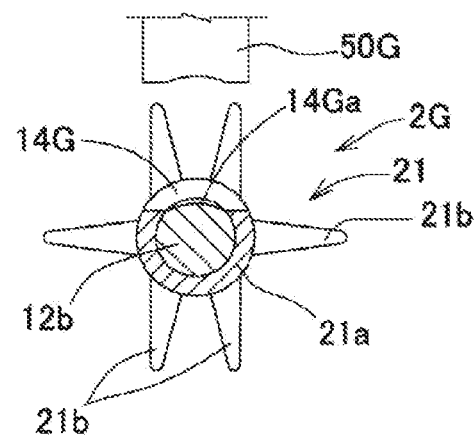
Figure 24:
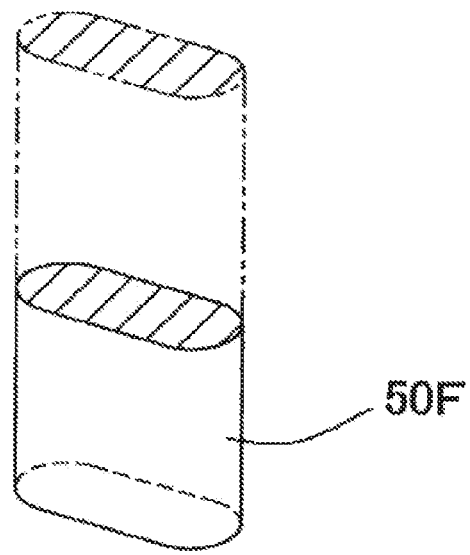
FIG. 24 is a perspective view of a main part of a tip end side portion of a holding pin that forms a cleaning portion recess with a bale shape (rectangular shape with curved short side portions, rectangular shape with rounded corners).

In this way, if each of the cleaning portion recesses 14 is configured to have an elongated shape in the axial direction, a width of cleaning portion recess 14 (the width along the circumferential direction of the cleaning portion) is small as compared to a circular cleaning portion recess formed by a circular holding pin having the same cross-sectional area as the cleaning portion recesses 14. As a result, the concentration of the stress in the vicinity of the cleaning portion recess when the same force is applied is alleviated, so that the effect of preventing the breakage of the core base portion is obtained. Further, the pin tip shape of the holding pin having an elongated shape in the axial direction has a longer length in the cleaning axis direction than the circular holding pin having the same cross-sectional area. During the molding of the soft portion, the holding pin having an elongated shape in the axial direction has stronger holding force for the core base portion 12 than the circular holding pin, and accordingly, vibrations of the core base portion during the molding of the soft portion are suppressed, and a depth of each of core base portion recesses 14Aa becomes difficult to deepen. In this way, the stress generated at the position where the core base portion recess 14Aa is provided can be alleviated, and the effect of preventing the breakage of the core base portion is obtained. As in the case of a cleaning portion 2G shown in FIG. 23A, FIG. 23B and FIG. 23C, instead of the cleaning portion recess 14, a cleaning portion recess 14G having a long front shape can also be formed at an angle in an axial direction of the cleaning portion 2G (in a spiral direction of the cleaning portion shaft). The cleaning portion recess 14G can be formed by a holding pin 50G having a plate shape as shown in FIG. 23A, FIG. 23B and FIG. 23C.

Figure 8:
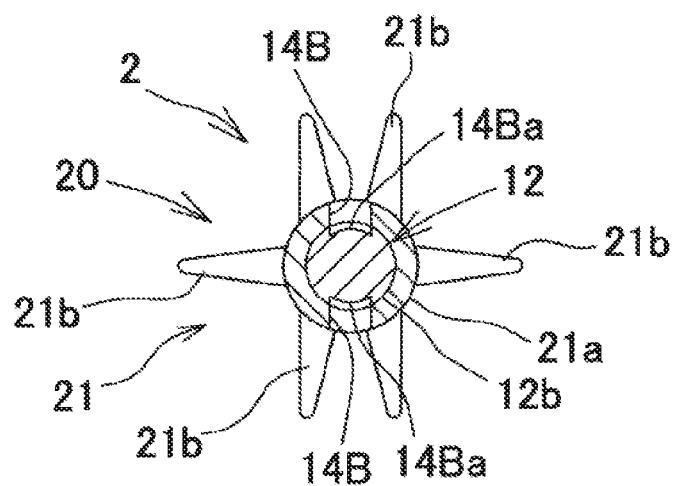
FIG. 8 is a view of a cleaning portion of another configuration, the view corresponding to FIG. 6.

A bottom surface of the core base portion recess 14a of the cleaning portion recess 14 reflects a shape of tip end supporting surfaces of holding pins 50 to 52 which are described later. As shown in FIG. 6, the bottom surface is constituted by a flat surface in a direction perpendicular to the depth direction of the core base portion recess 14a. However, the bottom surface may be configured in a recessed shape having a central part that rises as compared with both side portions as viewed from the axial direction of the cleaning portion 2. For example, in a state in which the holding pin bites into the entire surface of the tip end supporting surface and abuts against the same like a core base portion recess 14Ca of a cleaning portion recess 14C shown in FIG. 9, the bottom surface can be formed into an inverted V-shaped mount shape in which the shape of the tip end supporting surface is directly transferred and the center is raised, and so that a maximum depth of the recess 14Ca is set so as not to be at the central part of the recess 14Ca but to be at side positions sandwiching the central part, i.e., at the side end positions in this embodiment. Here, the bottom surface may have a shape that gently rises from both ends to the central part, and may have various other shapes are possible, by changing the shape of the tip end supporting surface of the holding pin, for example, as shown in a core base portion recess 14Ba of a cleaning portion recess 14B in FIG. 8. It is to be noted that, when the tip end portion of the holding pin to be described later does not completely bite into the core base portion and the central part of the tip end supporting surface of the holding pin does not contact the outer peripheral surface of the core base portion during the elastomer molding and maintains a gap therebetween, each of the core base portion recesses 14Ba and 14Ca is separated and formed into two parts with the central part interposed therebetween.

Figure 22:
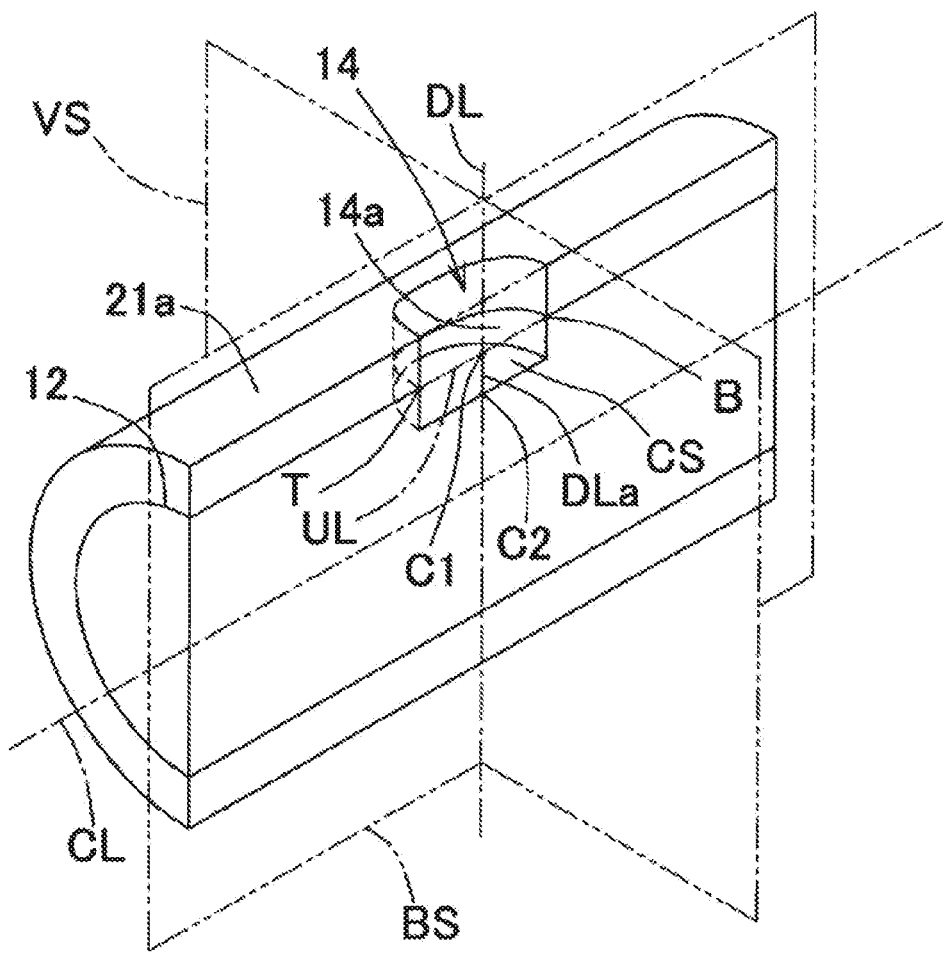
FIG. 22 is an explanatory view of a method for obtaining a maximum depth of a core base portion recess.

An opening area of the core base portion recess 14a is set to 0.15 mm$^2$ to 0.60 mm$^2$, preferably 0.17 mm$^2$ to 0.50 mm$^2$, more preferably 0.20 mm$^2$ to 0.40 mm$^2$. In particular, the core base portion recess 14a which is long in the axial direction is set to preferably 0.4 mm to 1.5 mm, more preferably 0.4 to 1.3 mm, still more preferably 0.5 mm or more and 1.1 mm or less, and most preferably 0.6 mm to 1.0 mm or less, in maximum in the axial direction. The opening area of the core base portion recess 14a is set to preferably 0.15 mm$^2$ to 0.6 mm$^2$, more preferably 0.17 mm$^2$ to 0.5 mm$^2$, and most preferably to 0.2 mm$^2$ to 0.4 mm$^2$. Further, it is preferable that a total area of the core base portion recesses 14a formed in one interdental cleaning tool 1 be set to 0.90 mm$^2$ to 3.6 mm$^2$. The opening areas of all the core base portion recesses 14a can be set to the same size, but it is preferable to set the opening areas so that the core base portion recess 14a closer to the tip end side of the core base portion 12 has a smaller opening area. Note that the opening area of the core base portion recess 14a means an area surrounded by a projected figure of a boundary line between the core base portion 12 exposed in the core base portion recess 14a, and the cleaning soft portion 21. The opening area is defined with respect to a plane perpendicular to the depth direction center line DL (see FIG. 22) of the core base portion recess 14a.

A plurality of the cleaning portion recesses 14 are individually provided on a first side portion and a second side portion in the cleaning portion 2 at intervals in the axial direction of the cleaning portion 2. Here, the first side portion and the second side portion of the cleaning portion 2 refer to a portion of the cleaning portion 2, which is molded by the second die 40, and a portion of the cleaning portion 2, which is formed by the second die 41. The first side portion and the second side portion mean a front half portion and back half portion of the cleaning portion 2, which correspond to the front side and back side of the handle base portion 11 having a flat shape.

Figure 5:
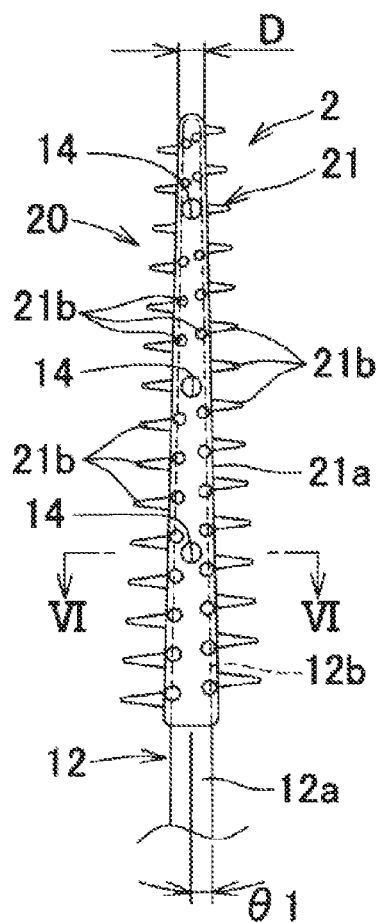
FIG. 5(a) is an enlarged front view of a cleaning portion.
FIG. 5(b) is an enlarged side view thereof.
Figure 5:
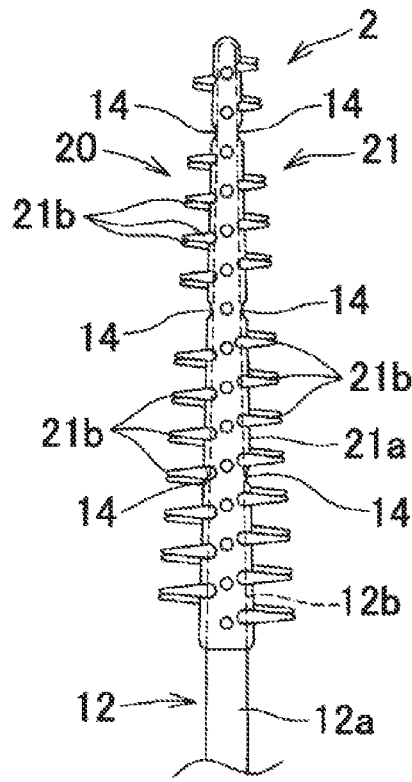

In the cleaning portion 2 shown in FIG. 5A, FIG. 5B and FIG. 6, the cleaning portion recesses 14 of the first side portion and the second side portion are disposed so as to face each other with the core base portion 12 interposed therebetween, and to have the depth direction that coincides with the mold opening and closing direction of the second dies 40 and 41. Three sets of the cleaning portion recesses 14 are provided at intervals in the axial direction of the cleaning portion 2 when a pair of the cleaning portion recesses 14 arranged to face each other is defined as one set. It is preferable that the number of pairs of the cleaning portion recesses 14 be two or more, desirably three or more. In this way, the number of sets of the cleaning portion recesses 14 is set to three or more or four or more, whereby the stress generated by the bending force acting on the cleaning portion 2 at the time of the interdental insertion or during the interdental cleaning can be dispersed. In addition, as described later, the depth of the core base portion recesses 14a is made shallow while ensuring holding properties for the core base portion 12 by the holding pins 50 to 52, whereby the breakage of the core base portion 12 due to local concentration of a large stress can be effectively prevented during the interdental cleaning.

Such arrangement intervals of the cleaning portion recesses 14 in the axial direction of the cleaning portion 2 may be entirely set to the same, but may partially or entirely be set to be different from one another. For example, the arrangement intervals may be set so as to become substantially uniform or narrower as approaching to the tip end side of the cleaning portion 2.

Figure 10:
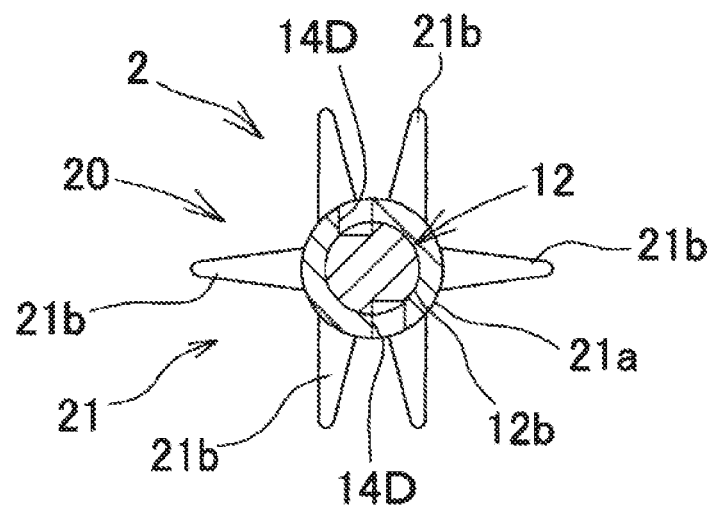
FIG. 10 is a view of a cleaning portion of another configuration, the view corresponding to FIG. 6.

Although it is preferable to arrange one set of the cleaning portion recesses 14 so as to face each other, the cleaning portion recesses 14 can also be provided at position shifted from each other in the axial direction of the cleaning portion 2 within a range where the cleaning portion recesses 14 partially overlap each other in the circumferential direction, that is, within a range of the length of the cleaning portion recesses 14 with respect to the axial direction of the cleaning portion 2 ("Not overlapping in the circumferential direction" means that two cleaning portion recesses of the two holding pins defining a pair are in a positional relationship of not overlapping each other even when the cleaning portion recesses are moved in the circumferential direction of the cleaning portion). Further, though it is preferable to arrange the cleaning portion recess 14 on the first side portion and the cleaning portion recess 14 on the second side portion on the identical axial line as shown in FIG. 6, a cleaning portion recess 14D can also be formed so that a center line of the cleaning portion recess 14D of the first side portion and a center line of the cleaning portion recess 14D of the second side portion are disposed in parallel so as to be shifted by a predetermined distance in a radial direction of the cleaning portion 2D, like a cleaning portion recess 14D of a cleaning portion 2D shown in FIG. 10.

In addition, arrangement positions of the cleaning portion recesses 14 with respect to the cleaning portion 2 can also be configured as follows. Here, cleaning portion recesses 14E and 14F and core base portion recesses 14Ea and 14Fa are formed by changing only forming positions thereof with respect to the cleaning portion 2 from the cleaning portion recesses 14 and the core base portion recesses 14a, and the front shape, depth, and opening area thereof can be configured similarly to the cleaning portion recesses 14 and the core base portion recesses 14a.

Figure 11:
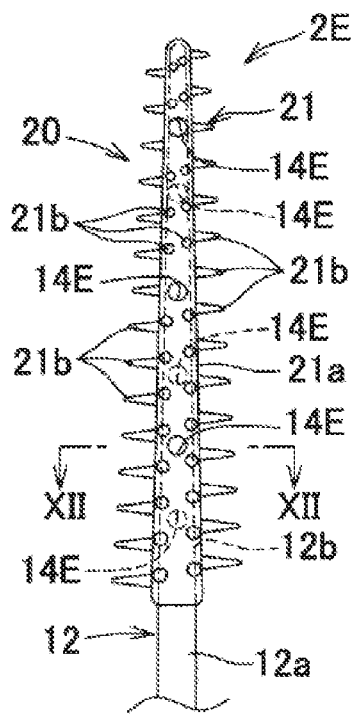
FIG. 11(a) is an enlarged front view of a cleaning portion of another configuration.
FIG. 11(b) is an enlarged side view thereof.
Figure 11:
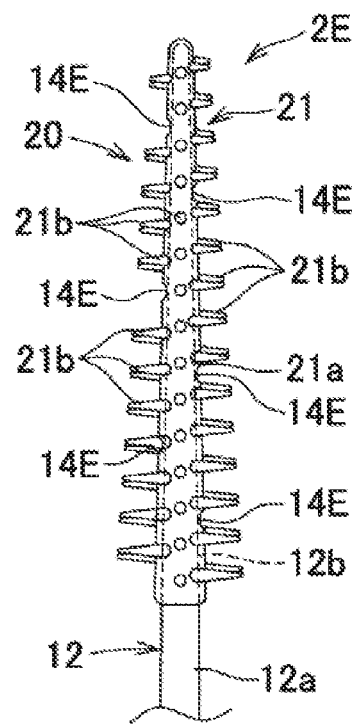
Figure 12:
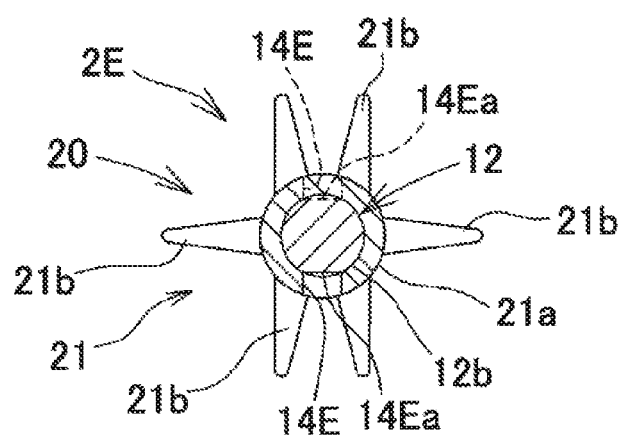
FIG. 12 is a cross-sectional view taken along line of FIG. 11(a).

Like the cleaning portion recess 14E and the core base portion recess 14Ea of a cleaning portion 2E shown in FIG. 11A, FIG. 11B and FIG. 12, the cleaning portion recess 14E of the first side portion and the corresponding cleaning portion recess 14E of the second side portion, which is in the same order counted from the tip end of the cleaning portion 2E, can be formed at an interval in the axial direction of the cleaning portion 2E so as not to overlap each other in the circumferential direction of the cleaning portion 2E. In FIG. 11A and FIG. 11B, the cleaning portion recesses 14E of the second side portion are disposed at the substantially central part between the adjacent cleaning portion recesses 14E of the first side portion. However, the cleaning portion recesses 14E of the second side portion can also be disposed at positions biased to the tip end side or the base end side between the adjacent cleaning portion recesses 14E in the first side portion. Further, all the cleaning portion recesses 14E on the first side portion and all the cleaning portion recesses 14E on the second side portion can also be formed at intervals in the axial direction of the cleaning portion 2E so as not to overlap each other in the circumferential direction of the cleaning portion 2E. Alternatively, the specific cleaning portion recess 14E on the first side portion and the corresponding cleaning portion recess 14E on the second side portion, which is in the same order counted from the tip end of the cleaning portion 2E, can also be formed at an interval in the axial direction of the cleaning portion 2E so as not to overlap each other in the circumferential direction of the cleaning portion 2E. It is preferable to set the interval between at least one set of the cleaning portion recesses 14E formed at an interval in the axial direction with respect to the axial direction of the cleaning portion 2E to a length of one fourth or more of a maximum axial length of the cleaning portion recesses 14E. Further, the number of the cleaning portion recesses 14E of the first side portion and the number of the cleaning portion recesses 14E of the second side portion are preferably the same, but can be differentiated from each other. For example, the number of the cleaning portion recesses 14E of the first side portion can be reduced by one than the number of the cleaning portion recesses 14E of the second side portion. The "interval in the axial direction of the cleaning portion 2E" of the two recesses which do not overlap each other in the circumferential direction refers to a shortest distance when ends of two recesses are connected to each other in the axial direction of the cleaning portion. Specifically, the interval is obtained by the following procedure. First, a plane (BS in FIG. 22) including UL and a center line (CL in FIG. 22) of the core base portion is set. Next, perpendicular lines are drawn to CL from the intersections (B, T in FIG. 22) of the respective recesses of the first side portion and the second side portion and the BS, and intersections of the perpendicular lines and CL are obtained. Further, intersections of CL and the perpendicular lines obtained from the first side portion are obtained. One is selected from the obtained two points on the CL in the first side portion, one is selected from two points on the CL in the second side portion, and a length between both of the points on the CL is obtained. Since there are four combinations, the number of lengths obtained above is four. A shortest length among the obtained four lengths is defined as the "interval in the axial direction of the cleaning portion 2E" between the two recesses which do not overlap each other in the circumferential direction. In the present application, there are two types of recesses, which are cleaning portion recess and a core base portion recess. The recesses are obtained by replacing the above-described "recess" by the recesses desired to be obtained.

In such a manner, the core base portion recesses 14Ea are formed alternately on the first side portion and second side portion of the core base portion 12. In this way, the pair of core base portion recesses can be prevented from being formed at the same position in the axial direction of the core base portion 12. Therefore, the cross-sectional area of the core base portion 12 at each of the positions corresponding to the core base portion recesses 14Ea can be increased to prevent the core base portion 12 from being broken. In addition, the positions in the axial direction of the core base portion, where the respective holding pins apply force to the core base portion, do not overlap each other, so that a portion in the axial direction of the core base portion, where the core base portion is subjected to the force, is longer than in the case of disposing the holding pins which overlap each other in the circumferential direction. As a result, the core base portion is more firmly held, and the core base portion recesses 14Ea formed during the molding of the soft portion 20 is suppressed from being deepened. Hence, the cross-sectional area of the core base portion 12 at each of the positions corresponding to the core base portion recesses 14Ea is increased, and the occurrence of breakage of the core base portion 12 can be prevented. Furthermore, the interval between holding pins 50A to 52A of the second die 40 and the interval between the holding pins 50A to 52A of the second die 41 in the length direction of the core base portion 12 are shortened, thereby holding the core base portion satisfactorily stably.

Figure 13:
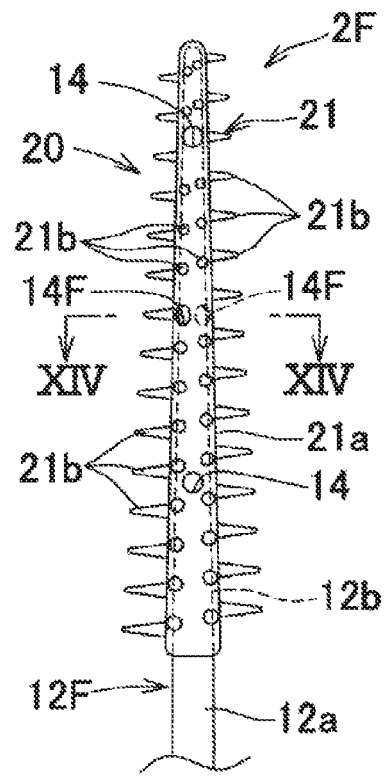
FIG. 13 is an enlarged front view of a cleaning portion of another configuration.
Figure 14:
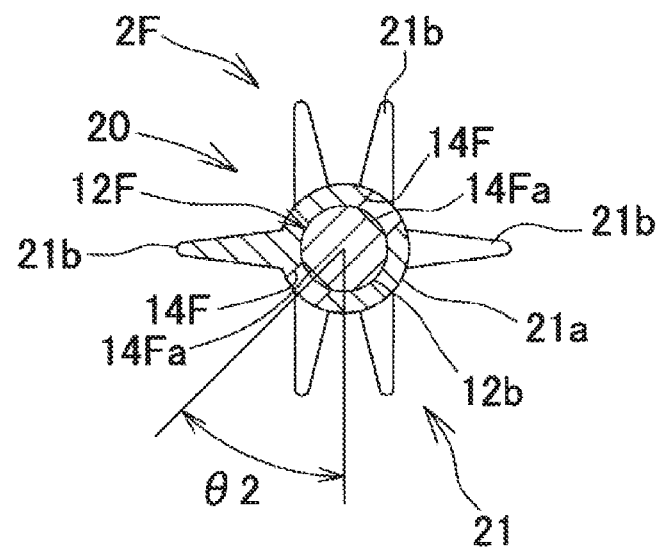
FIG. 14 is a cross-sectional view taken along line XIV-XIV of FIG. 13.
Figure 20:
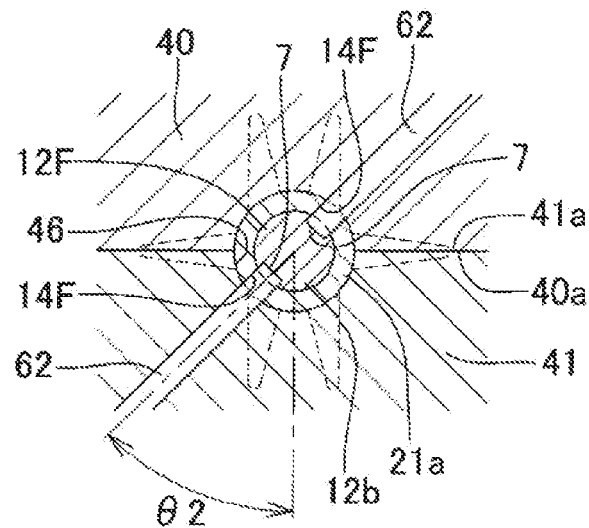
FIG. 20 is an explanatory view of a second die of another configuration.

(2) Like the cleaning portion recesses 14F and core base portion recesses 14Fa of a cleaning portion 2F shown in FIGS. 13 and 14, the cleaning portion recess 14F and core base portion recess 14Fa of the first side portion and the cleaning portion recess 14F and core base portion recess 14Fa of the second side portion can also be arranged so as to face each other with a core base portion 12F interposed therebetween, and to allow the depth direction to be inclined at an angle θ2 in the circumferential direction with respect to the mold opening and closing direction of the second dies 40 and 41 (see FIG. 20). However, the cleaning portion recesses 14F and 14 on the first side and the second side portion can also be formed so as to be shifted in the axial direction similarly to the cleaning portion recesses 14E.

In the cleaning portion 2F shown in FIG. 13, only a second set of the cleaning portion recesses 14 from the tip end of the cleaning portion 2 shown in FIG. 5A and FIG. 5B are replaced by the cleaning portion recesses 14F, and first and third sets from the tip end of the cleaning portion 2F are constituted by the cleaning portion recesses 14 arranged so that the depth direction coincides with the mold opening and closing direction of the second dies 40 and 41. Here, one or plural sets of the cleaning portion recesses 14 at an arbitrary position in the cleaning portion 2 can also be replaced by the cleaning portion recesses 14F.

When the angle θ2 exceeds 60°, holding pins 62 (see FIG. 20) provided in adjacent cleaning soft portion molding portions 46 sometimes interfere with each other, so that the angle θ2 is set preferably to 60° or less, desirably 45° or less. Note that plural types of cleaning portion recesses having different angles θ2 with respect to the cleaning portion can also be provided.

As described above, when the cleaning portion recesses 14F are provided at positions where the angle θ2 is provided with respect to the mold opening and closing direction, in the case of forming the plurality of cleaning protrusions 21b, which protrude outward, in the cleaning soft portion 21, a degree of freedom in arrangement layout of the cleaning protrusions 21b can be improved. In other words, the cleaning portion recesses 14F are formed by holding pins which hold the core base portion 12 in the central part of the second molding space 42. Since the positions of the holding pins 62 can be adjusted in the length direction and the circumferential direction with respect to the second molding space 42 without interfering with the forming positions of the cleaning protrusions 21b, the degree of freedom in the arrangement layout of the cleaning protrusions 21b can be improved. Further, since the handle base portion 11 is formed flat, when the space between the molars is cleaned with the handle base portion 11 being gripped with the fingers, the cleaning portion 2 is curved as shown by a virtual line in FIG. 2A and FIG. 2B within a plane substantially perpendicular to the plane including the handle base portion 11 (that is, in the mold opening and closing direction). Since the cleaning portion recesses 14B are disposed so that the depth direction thereof forms an angle θ2 with respect to the mold opening and closing direction, the core base portion 12F can be effectively prevented from being broken from the cleaning portion recess 14F as a starting point.

<Manufacturing Method>

Next, a method for manufacturing the interdental cleaning tool will be described.

As shown in FIG. 15, FIG. 16, FIG. 17A and FIG. 17B, the method for manufacturing the interdental cleaning tool includes: a base portion molding step of filling a synthetic resin material into first molding spaces 32 of the first dies 30 and 31 to mold the base portions 10; and a soft portion molding step of placing, in the second molding spaces 42 of the second dies 40 and 41, the base portions 10 molded in the first dies 30 and 31 and then filling an elastomeric material into the second molding spaces 42 to form the soft portions 20. Note that the first dies 30 and 31 correspond to a first mold and second mold of a first die, respectively, and the second dies 40 and 41 correspond to a first mold and second mold of a second die, respectively.

(Base Portion Molding Step)

Figure 15:
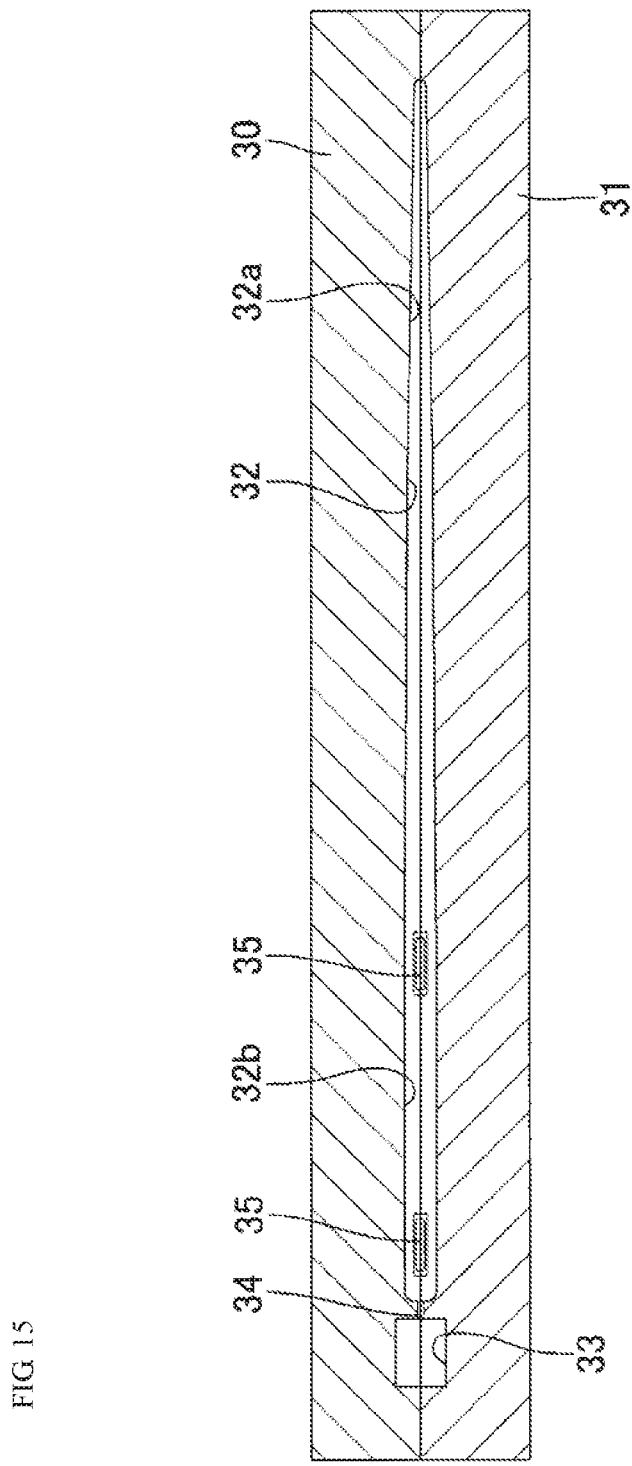
FIG. 15 is an explanatory view of a method of molding a base portion with a first die.

At the base portion molding step, as shown in FIG. 15, a synthetic resin material is filled into the first molding spaces 32 of the first dies 30 and 31 to mold the base portions 10. More specifically, the first dies 30 and 31 used have: a plurality of the first molding spaces 32 that are arranged in parallel, and each have a core base portion molding portion 32a and a handle base portion molding portion 32b; a pair of connecting portion molding portions 35 each formed between the adjacent handle base portion molding portions 32b to communicate therewith; a runner 33 formed on the base end side of the plurality of first molding spaces 32; and gates 34 through which the first molding spaces 32 communicate with the runner 33. When supplied to the runner 33, a synthetic resin material is allowed to pass through the gates 34 and filled into the first molding spaces 32 to allow a plurality of the base portions 10 to be simultaneously molded. Thus, a primary molded product 10A is molded, which includes the plurality of base portions 10, a runner portion 37, gate portions 36, and the connecting portions 13. The base portions 10 may be molded one by one. However, the simultaneous molding of a plurality of base portions 10 makes it possible to improve the productivity and to transfer the base portions 10 at the same time by holding the molded runner portion 37, which can improve the workability and thus is preferred. Each gate 34 may be formed at any position on the base end portion side opposite to the core base portion molding portion 32a of the first molding space 32, more preferably on the base end portion side opposite to the core base portion molding portion 32a of the first molding space 32 with respect to the connecting portion molding portion 35. However, a side gate should preferably be formed as the gate 34 at the base end portion of the first molding space 32, so that a possibility of causing the gate portions 36 of the primary molded product 10A to be pinched between the second dies 40 and 41 can be reduced in the process of loading the primary molded product 10A into the second dies 40 and 41. Alternatively, a hot runner may be provided instead of the runner 33 including a cold runner in the first dies 30 and 31. However, the use of the hot runner can make the first dies 30 and 31 large and increase manufacturing cost. Therefore, the runner 33 including the cold runner is preferably provided. In addition, the plurality of base portions 10 can be stably connected to one another by the runner portion 37, which can improve the handling properties of the primary molded product 10A in the process of transferring the primary molded product 10A into the second dies 40 and 41, and thus is preferred. In addition, a pin gate having, for example, a cylindrical or spindle shape with a diameter of 0.1 to 1.5 mm can be preferably adopted as each gate 34 to allow use of a cold runner, and the gates 34 can be arranged at narrow intervals, which can make the molded product small.

(Soft Portion Molding Step)

Figure 16:
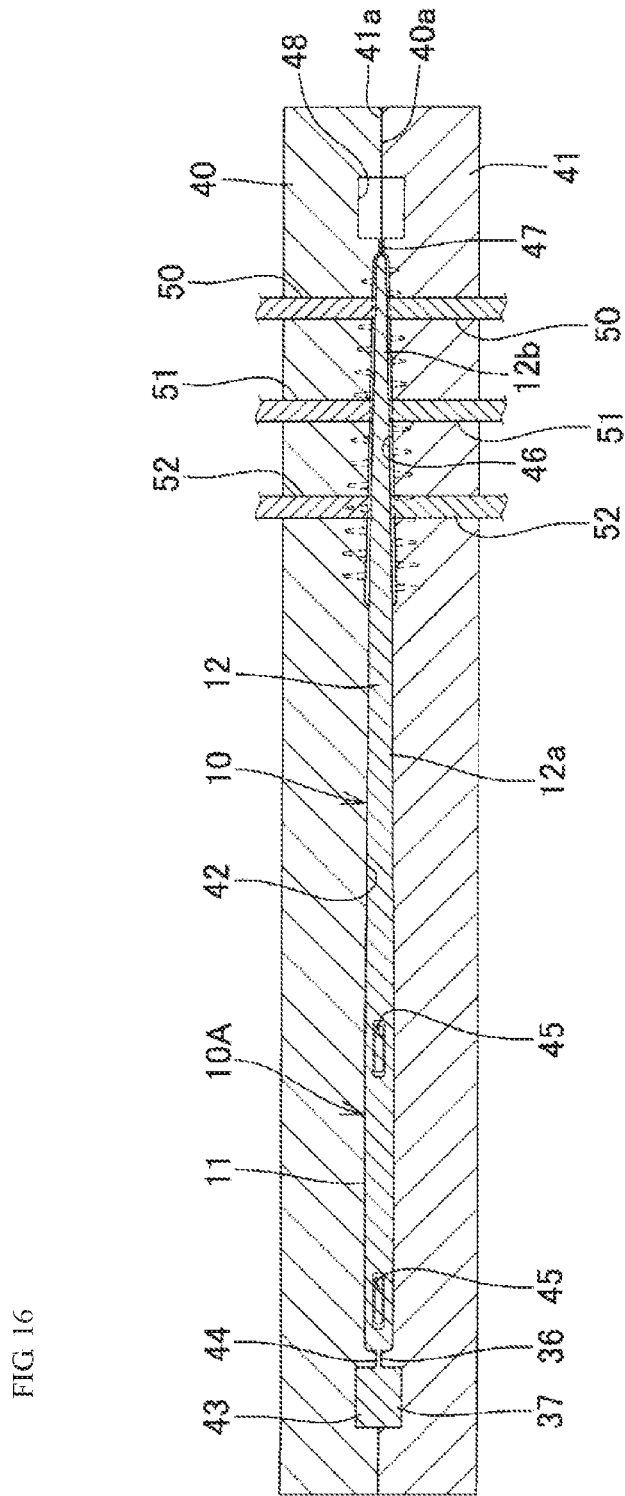
FIG. 16 is an explanatory view of a method of molding a soft portion with a second die.

In the soft portion molding step, as shown in FIG. 16, FIG. 17A and FIG. 17B, the primary molded product 10A molded in the first dies 30 and 31 is placed in each of the second molding spaces 42 of the second dies 40 and 41. Then, the second molding space 42 is filled with an elastomeric material to mold the soft portion 20, whereby the interdental cleaning tool connected body 5 in which a plurality of the interdental cleaning tools 1 are continuously connected in parallel to one another is obtained.

First, the second dies 40 and 41 used in the soft portion molding step will be described. The second dies 40 and 41 have a plurality of the second molding spaces 42, which are formed at positions corresponding to a plurality of the base portions 10 of the primary molded product 10A molded in the first dies 30 and 31. In addition, the second dies 40 and 41 also have fitting spaces 43, 44 and 45 formed to accommodate the runner portion 37, a plurality of the gate portions 36, and the connecting portions 13 in the primary molded product 10A. Between the second dies 40 and 41 and the base portion 10, the cleaning soft portion molding portion 46 surrounding the core base portion 12 is formed as the second molding space 42. Gates 47 which open to the tip end portions of the cleaning soft portion molding portions 46 are formed on the mating surfaces 40a and 41a of the second dies 40 and 41 on the tip end side of the cleaning soft portion molding portions 46. The plurality of gates 47 communicate with a, common runner 48 formed in the second dies 40 and 41. The elastomeric material is supplied from the common runner 48 to the plurality of second molding spaces 42 via the plurality of gates 47. The gates 47 are preferably set to be a diameter of 0.1 mm or more and 1.0 mm or less.

Figure 17:
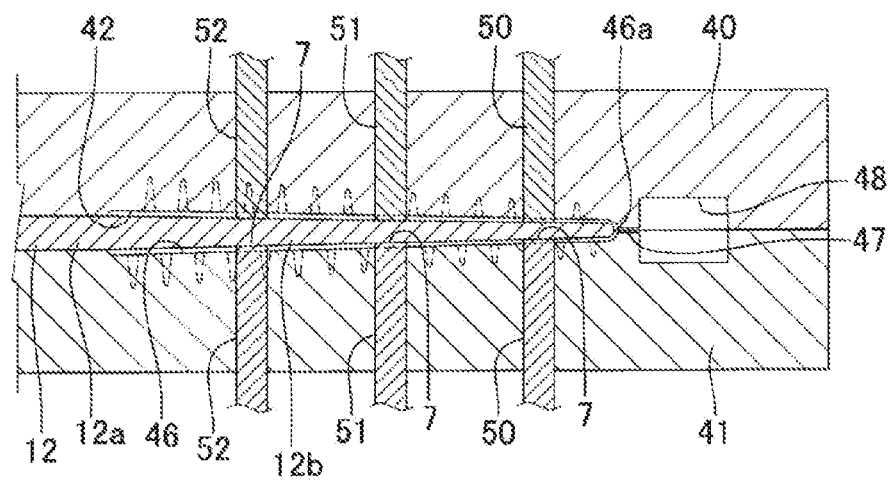
FIG. 17(a) is an explanatory view immediately before molding the soft portion with the second die.
FIG. 17(b) is an explanatory view immediately after molding the soft portion with the second die.
Figure 17:
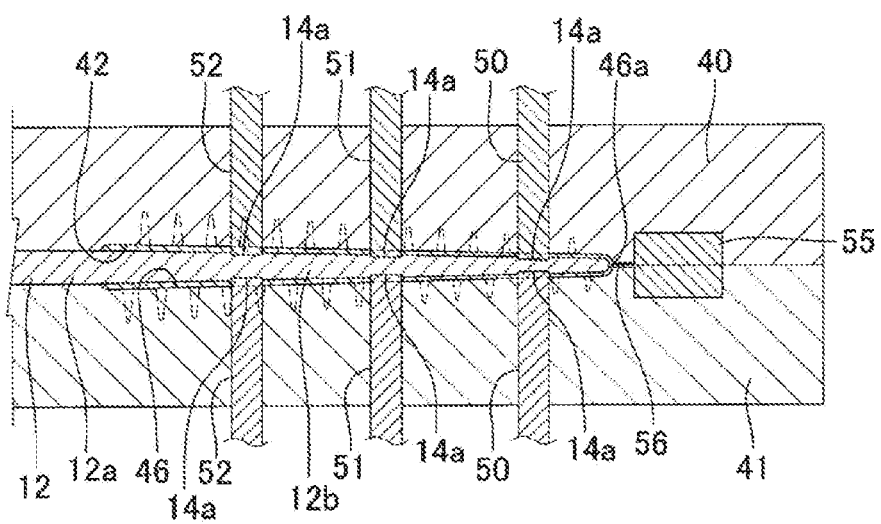

In the second dies 40 and 41, a pair of tip end side holding pins 50, a pair of intermediate portion holding pins 51 and a pair of base end side holding pins 52 are provided so as to respectively correspond to the tip end side portion, intermediate portion and base end side portion of the cleaning soft portion molding portion 46, and so that the holding pins of each pair face each other. These three sets of holding pins 50 to 52 are provided so as to be freely movable in a direction substantially perpendicular to the mating surfaces 40a and 41a of the second dies 40 and 41, in other words, in the mold opening and closing directions of the second dies 40 and 41. As shown in FIG. 17(*b*), the core base portion 12 of the base portion 10 allows the tip end portions of these three sets of holding pins 50 to 52 to protrude into the cleaning soft portion molding portion 46, and sandwiches the core base portion 12 between the tip end portions of the holding pins 50 to 52 of the respective sets, whereby the core base portion 12 is accurately positioned and held in the central part of the cleaning soft portion molding portion 46.

When the cleaning soft portion molding portion 46 is filled with the elastomeric material, the core base portion 12 is softened by being exposed to the high temperature elastomer material, and the core base portion recesses 14a are formed on the outer peripheral surface of the core base portion 12 by the tip end portions of the holding pins 50 to 52. A concentration of a large stress occurs at the forming position of the core base portion recess 14a when bending force is applied to the cleaning portion 2 at the time of inserting the cleaning portion 2 into the interdental space or during interdental cleaning by the cleaning portion 2, and this concentration may cause the breakage of the core base portion 12. Therefore, in order to prevent the breakage, a maximum depth d of each of the core base portion recesses 14a is set to 0.03 mm or less, preferably 0.1 mm or more and 0.02 mm or less.

Specifically, with regard to each of the holding pins 50 to 52, the cross-sectional shape thereof is formed in a shape elongated in the length direction of the second molding space, in this embodiment, a Japanese straw ricebag shaped (rectangular shape with curved short side portions, rectangular shape with rounded corners), the maximum length dimension thereof along the length direction is set to 0.4 mm or more and 1.5 mm or less, more preferably 0.4 mm to 1.3 mm or less, still more preferably 0.5 mm or more and 1.1 mm or less, most preferably 0.6 mm to 1.0 mm or less, and the cross sectional area thereof (sectional area of the cross section perpendicular to the axial direction of the tip end portion) is set to 0.15 mm$^2$ or more and 0.6 mm$^2$ or less, more preferably 0.17 mm$^2$ or more and 0.5 mm$^2$ or less, still more preferably 0.2 mm$^2$ or more and 0.4 mm$^2$ or less. The pins are formed into a shape elongated in the length direction, whereby the influence of the Karman vortex during the molding can be suppressed. In addition to the bale shape (rectangular shape with curved short side portions, rectangular shape with rounded corners), various shapes including long shapes in the spiral direction of the cleaning portion shaft, such as an elliptical shape, a rectangular shape, a teardrop shape and a parallelogram shape, are possible.

The cross-sectional area of the tip end portion of the holding pins 50 located on the most tip end side is set to be substantially identical in size to one another or smaller as compared with the cross-sectional areas of the tip end portions of the holding pins located at other positions, in addition, the cross-sectional areas of the intermediate portion holding pins 51 and the base end side holding pins 52 are set to be substantially identical in size to one another, or the cross-sectional area of the intermediate portion holding pins 51 is set larger than the cross-sectional area of the base end side holding pins 52. That is, a passage area at the tip end side portion of the cleaning soft portion molding portion 46 is small. Accordingly, the cross-sectional area of the tip end side holding pins 50 is made as small as possible, whereby a flow resistance of the elastomeric material is set as small as possible. In addition, the influence of the Karman vortex generated during molding is suppressed, whereby poor filling of the elastomeric material with respect to the cleaning soft portion molding portion 46 can be prevented, and excessive melting of the core base portion 12 can be prevented. Accordingly, such a small cross-sectional area of the tip end side holding pins 50 is preferable. However, it is also possible to provide a plurality of sets of the intermediate portion holding pins 51 at intervals in the axial direction. It should be noted that the cross-sectional area of the tip end portion of the holding pin has very little change in area due to shaking or expansion/shrinkage during molding. Accordingly, even if these factors are taken into consideration, it can be presumed that the cross-sectional area becomes substantially the same as an area of the opening portion of the cleaning portion recess to be formed by the holding pin.

Each of the tip end side holding pins 50 is provided within a range of 3 mm from a tip end portion 46a of the cleaning soft portion molding portion 46 toward the base end side, each of the intermediate portion holding pins 51 is provided within a range of ±10% of the length of the cleaning portion 2 in the axial direction around an intermediate point between the tip end side holding pin 50 and the base end side holding pin 52, and each of the base end side holding pins 52 is provided within a range of 6 mm from the base end portion of the cleaning soft portion molding portion 46 toward the tip end side. The respective holding pins with the above-described cross-sectional areas are arranged at these positions, whereby it can be expected not only to ensure the fixation of the core base portion 12 during molding but also to prevent the influence on the molded product due to the Karman vortex generated during molding.

In the soft portion molding step, in a state in which the primary molded product 10A is placed in the second molding space 42 and the mold is closed, as shown in FIG. 17(*a*), a pair of the tip end side holding pins 50, a pair of the intermediate portion holding pins 51, and a pair of the base end side holding pins 52 are protruded in the cleaning soft portion molding portion 46, as shown in FIG. 17(*b*). Then, the core base portion 12 is held by these three sets of the holding pins 50 to 52, the elastomeric material is injected and supplied to the plurality of gates 47 through the common runner 48, and the elastomeric material is filled into the cleaning soft portion molding portion 46. At this time, the core base portion 12 is softened by the heat of the elastomeric material, and the core base portion recesses 14a are formed by the tip end portions of the holding pins 50 to 52. Then, the maximum depth d of each of the core base portion recesses 14a is set to 0.03 mm or less, preferably 0.01 mm or more and 0.02 mm or less. Therefore, the core base portion 12 can be prevented from being broken due to the occurrence of the concentration of the large stress at the forming position of the core base portion recess 14a when the bending force is applied to the cleaning portion 2 at the time of inserting the cleaning portion 2 into the interdental space or during interdental cleaning by the cleaning portion. Further, the cross-sectional area of the holding pin 50 is set smaller than the cross-sectional area of the holding pins 51 and 52. Accordingly, the filling of the elastomeric material from the tip end portion of the cleaning soft portion molding portion 46 toward the base end side thereof is not inhibited by the holding pins 50 to 52 as much as possible. Even if an injection pressure somewhat varies, the core base portion 12 can be prevented from being curved, and the cleaning soft portion 21 constituted by the elastomeric material can be molded with high accuracy.

In this way, the base portion 10 is covered with the soft portion 20, and then the runner portion 37 and the gate portions 36 which are made of the synthetic resin are removed. In addition, a runner portion 55 and gate portions 56 which are made of the elastomer molded with the runner 48 and the gates 47, are removed. In this way, the interdental cleaning tools 1 are obtained.

Figure 21A:
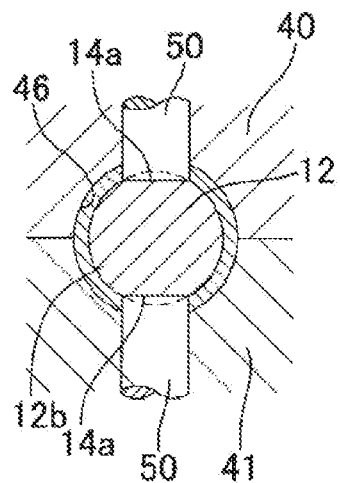
FIGS. 21(a) to 21(c) are explanatory views of end shapes of holding pins.
Figure 21B:
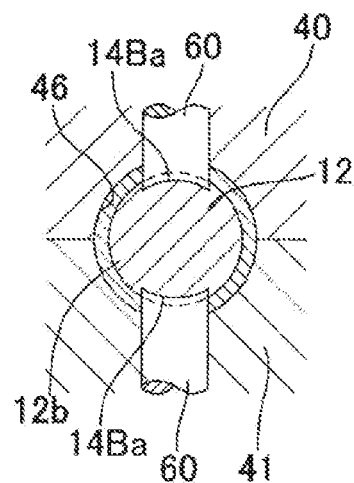
Figure 21C:
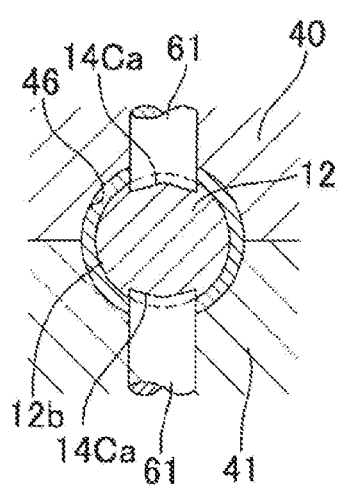

Tip end surfaces of the holding pins 50 to 52, which abut against the core base portion 12, are constituted by flat faces perpendicular to the axial direction of the holding pins 50 to 52 as shown in FIG. 21(a). However, the tip end surfaces may be constituted by circular arc surfaces along the outer peripheral surface of the core base portion 12 as in holding pins 60 shown in FIG. 21(b), or may be each constituted by a pair of inclined planes connected in an isosceles triangle as in holding pins 61 shown in FIG. 21(c). With this configuration, a contact area between the core base portion 12 and each of the holding pins 60 and 61 can be set large, and a depth of the core base portion recesses 14a can be set shallow. In addition, the core base portion 12 can be accurately held in the central part of the second molding space 42, and moreover, the holding properties for the core base portion 12 can be improved. Accordingly, this configuration is preferable. Moreover, holding pins having tip end surfaces with different shapes may be arbitrarily combined and used.

Figure 9:
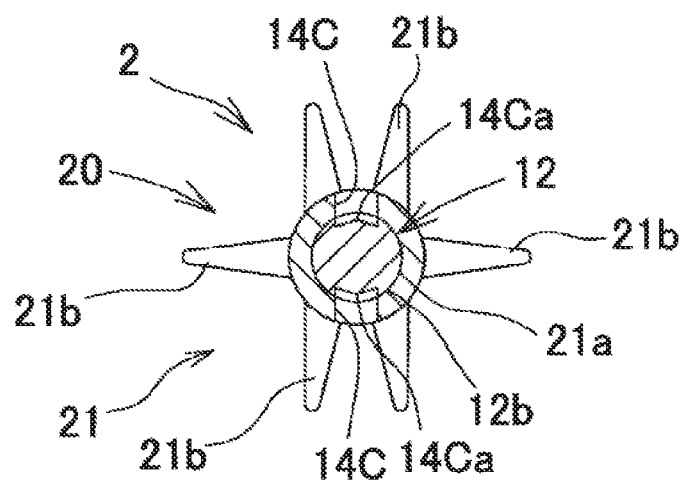
FIG. 9 is a view of a cleaning portion of another configuration, the view corresponding to FIG. 6.

Here, when a bottom surface shape of the core base portion recesses 14Ca is formed into an inverted V-shaped mount shape in which a center is raised, as shown in FIG. 9, a tip end supporting surface 7 abutting against the core base portion 12 of each of the holding pins 61 is formed such that a central part 70 is recessed as compared with both side parts 71 and 71 when viewed from the axial direction of the cleaning soft portion molding portion 46, as shown in FIG. 25A, FIG. 25B and FIG. 25C. In addition, the tip end supporting surface 7 is formed into a shape having regions which abut against at least both side parts 71 from the beginning when the holding pin 61 contacts the outer surface of the core base portion 12. As a result, unlike the conventional holding pin with a flat tip end or a raised center, the core base portion 12 is held in a stable posture by force dispersed from the beginning of the contact of the holding pin by the at least both side parts 71. Therefore, the holding pin 61 can hold the core base portion 12 without deeply biting into the core base portion 12, and the depth of the core base portion recess 14a to be formed can be made shallow.

More specifically, as shown in FIG. 25A, FIG. 25B and FIG. 25C, both side parts 71 are first brought into contact with the outer surface of the core base portion 12, and hold the core base portion 12 in a stable posture at at least two positions as compared with the conventional flat pin, the holding pin 61 usually bites into the core base portion 12, due to the core base portion 12 that is not completely cooled down and is in a soft state, or due to own weight thereof or the like. However, the holding pin 61 supports the core base portion 12 at at least two positions from the beginning, and therefore, force thereof is dispersed. Instead of biting deeply from the beginning like the conventional flat pin, the holding pin 61 receives the force on the entire tip end supporting surface 7, and such a biting depth is suppressed.

Then, particularly while the elastomer is being filled and molded, the core base portion 12 is thermally expanded or softened by being exposed to a high temperature elastomer, and furthermore, the core base portion 12 receives force and vibrates during the filling with the elastomer, and the holding pin 61 attempts to further bite into the core base portion 12. However, in the present invention, the core base portion 12 is held in a stable posture at two positions from the beginning, and the above-described vibrations can also be effectively suppressed. Therefore, final biting is also suppressed to be shallow.

Figure 26:
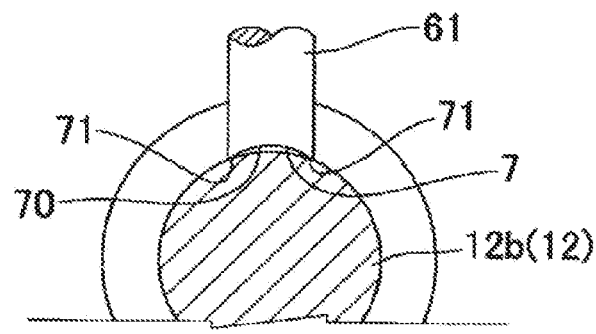
FIGS. 26(a), 26(b) and 26(c) are explanatory views individually showing other modification examples of the holding pin having the hollow at the tip end portion.
Figure 26:
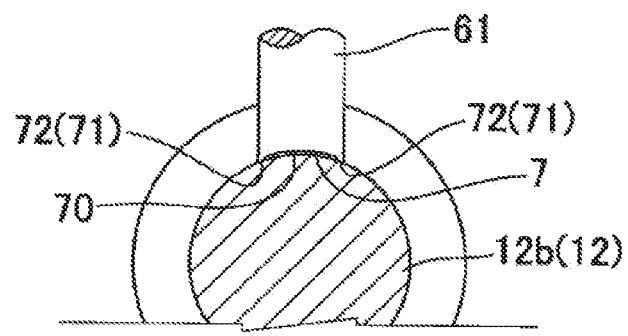
Figure 26:
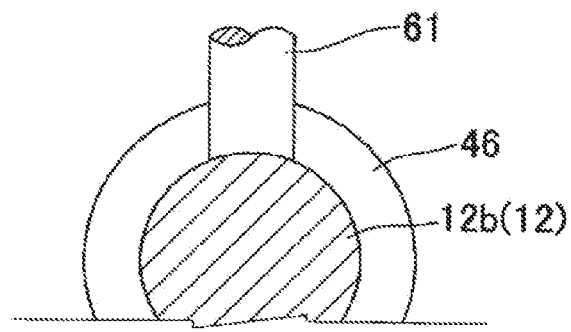

In this embodiment, the shape of the tip end supporting surface 7 of the holding pin 61 is formed into a shape recessed substantially in a V shape when viewed from the axial direction of the cleaning soft portion molding portion 46. However, the present invention is not limited to this. As long as the shape of the tip end supporting surface 7 is such a shape having regions which abut against both side parts 71 from the beginning of the holding pin 61 contacting the outer surface of the core base portion 12, it is preferable that the shape of the tip end supporting surface 7 may be, one having a gentle shape that is substantially U shape when viewed from the axial direction of the cleaning soft portion molding portion 46 as shown in FIG. 26(a), and may be a shape in which protrusions 72 are provided on both side portions when viewed from the axial direction of the cleaning soft portion molding portion 46 as shown in FIG. 28(b), for example.

Both side parts 71, which abut against the core base portion 12 from the beginning, do not necessarily have to include the exemplified side end edges of the tip end supporting surface 7, but may be intermediate regions between the central part 70 and the side end edges. In addition, in each of the above-described examples of the tip end supporting surface 7, such a shape is adopted, in which the central part 70 initially maintains a gap with the outer surface of the core base portion 12 without abutting against the outer surface. However, the present invention is not limited to this. The tip end supporting surface 7 just needs to have a shape in which at least both side parts 71 sandwiching the central part 70 abut against the outer surface from the beginning. Such a shape in which the central part 70 also abuts simultaneously is also included in the present invention. Specifically, a shape shown in FIG. 26(c), which is substantially U-shaped as in FIG. 26(a) and has the entire surface of the tip end supporting surface 7 abut against the core base portion 12 from the beginning, is also included in the present invention.

The arrangement positions of the holding pins 50 to 52 with respect to the second dies 40 and 41 can also be configured as follows.

Figure 18:
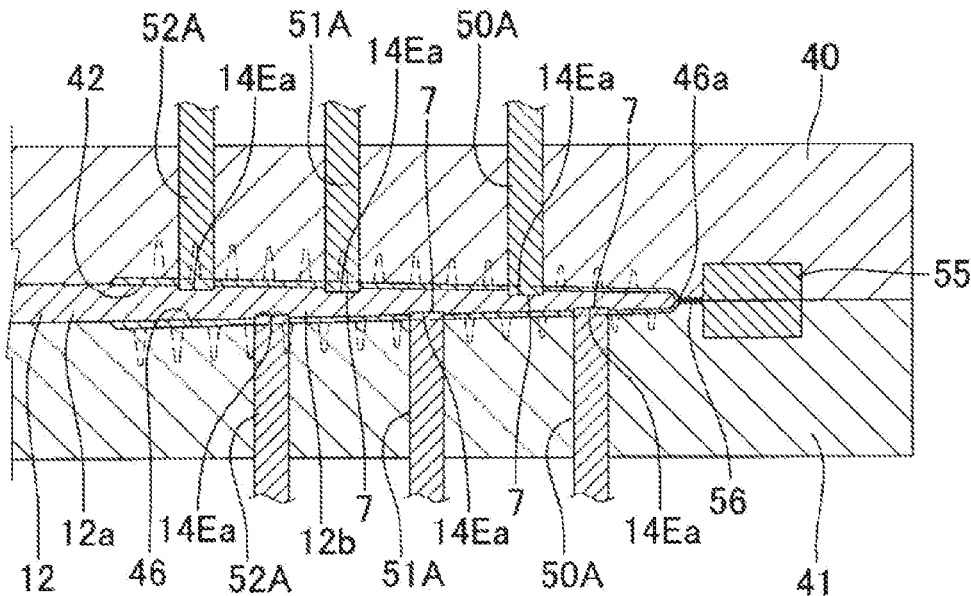
FIG. 18 is an explanatory view of a second die of another configuration.
Figure 19:
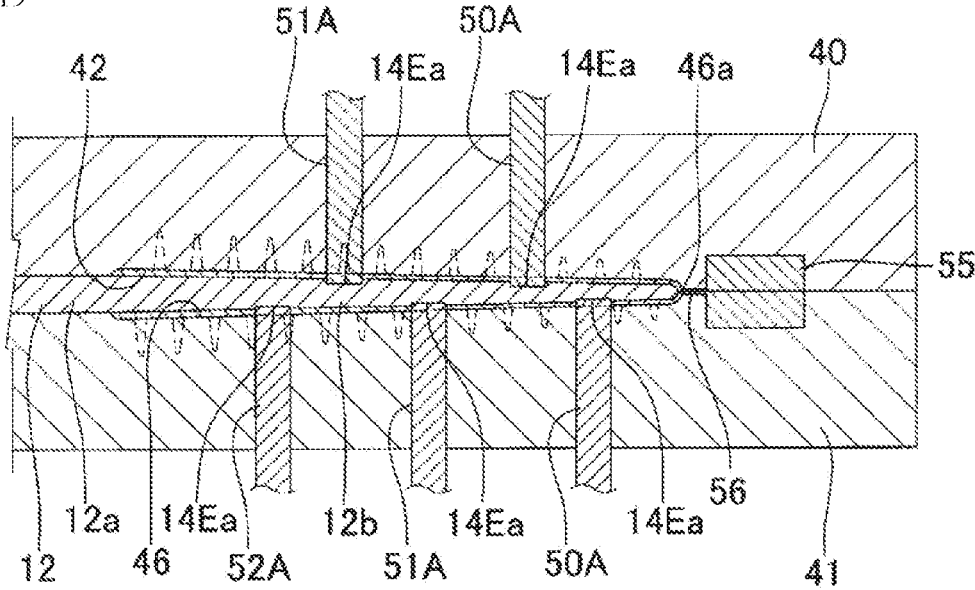
FIG. 19 is an explanatory view of a second die of another configuration.

(1) Like the holding pins 50A to 52A of the second dies 40 and 41 shown in FIG. 18, the holding pins 50A to 52A of the second die 40 can be formed at intervals in the center line direction of the cleaning soft portion molding portion 46 so as not to overlap, in the circumferential direction of the cleaning soft portion molding portion 46, with respect to the holding pins 50A to 52A of the second die 41, which are provided in the same orders with those of the second die 40 counted from the tip end of the cleaning soft portion molding portion 46, and correspond to the holding pins 50A to 52A of the second die 40. In FIG. 18, the adjacent holding pins 50A to 52A in the second die 40 are disposed in the substantially central parts between the holding pins 50A to 52A of the second die 41. As another aspect, the holding pins 50A to 52A of the second die 40 can also be arranged at positions biased to the tip end side or the base end side between the adjacent holding pins 50A to 52A in the second die 41. Further, such an aspect can be adopted, in which all the holding pins 50A to 52A of the second die 40 and all the holding pins 50A to 52A of the second die 41 can also be formed at intervals in the length direction of the cleaning soft portion molding portion 46 so as not to overlap each other in the circumferential direction of the cleaning soft portion molding portion 46. In addition, such an aspect can be adopted, in which the specific holding pin of the second die 40 and the corresponding holding pin of the second die 41, which is located on the same order counted from the tip end of the cleaning soft portion molding portion 46, can also be formed at an interval in the length direction of the cleaning soft portion molding portion 46 so as not to overlap each other in the circumferential direction of the cleaning soft portion molding portion 46. The number of the holding pins of the second die 40 and the number of the holding pins of the second die 41 are preferably the same, but can be differentiated from each other. For example, as shown in FIG. 19, one of the holding pins 52A of the second die 40 can be omitted, and the number of the holding pins 52A of the second die 40 can be reduced by one than the number of the holding pins of the second die 41.

As described above, when the holding pins 50A to 52A of the first die 40 are disposed so as to be shifted in the axial direction with respect to the holding pins 50A to 52A of the second die 41, the cross-sectional area of the core base portion 12 at the position corresponding to the core base portion recess 14Ea is increased, as compared with the case where the holding pins are disposed so as to face each other. Accordingly, the occurrence of the breakage of the core base portion 12 can be prevented. Further, such axial portions of the core base portion 12 which receive force from the respective holding pins 50A to 52A during the molding of the cleaning soft portion 21 are doubled as compared with the case where the respective holding pins are arranged to face each other. Therefore, the holding of the core base portion is strengthened. As a result, since the vibrations of the core base portion during the molding of the soft portion are suppressed, the core base portion recesses 14Ea to be formed is suppressed from being deepened, and the occurrence of the breakage of the core base portion 12 can be prevented. Furthermore, since the interval between the holding pins 50A to 52A in the length direction of the core base portion 12 is substantially shortened, it is possible to hold the core base portion 12 satisfactorily stably.

(2) Like the holding pins 62 of the second dies 40 and 41 shown in FIG. 20, the holding pin 62 of the first die 40 and the holding pin 62 of the second die 41 can also be disposed in such a manner of being opposite to each other with the core base portion 12 interposed therebetween, and of having the axial direction thereof forms the angle θ2 in the circumferential direction with respect to the mold opening and closing direction of the second dies 40 and 41. Here, the holding pins 62 on the first side and the second side portion can also be formed so as to be shifted in the length direction of the cleaning soft portion molding portion 46, like the holding pins 50A to 52A in FIG. 18.

For example, only the second set of the holding pins from the tip end of the cleaning soft portion molding portion 46 can be replaced by the holding pins 62. In addition, the first and third sets from the tip end of the cleaning soft portion molding portion 46 can be constituted by the holding pins arranged so that the axial direction thereof coincides with the mold opening and closing direction of the second dies 40 and 41. However, one or plural sets of the holding pins at arbitrary positions in the cleaning soft portion molding portion 46 can be replaced by the holding pins 62.

When the angle θ2 exceeds 60°, the holding pins 62 provided in the adjacent cleaning soft portion molding portions 46 sometimes interfere with each other, so that the angle θ2 is set preferably to 60° or less, desirably 45° or less. Plural types of the holding pins 62 having different angles θ2 can also be provided in the second dies 40 and 41.

As described above, the holding pins 62 may be provided at the positions where the angle θ2 is provided with respect to the mold opening and closing direction. Under such a condition, when the plurality of cleaning protrusions 21b, which protrude outward, are formed in the cleaning soft portion 21, the degree of freedom in arrangement layout of the cleaning protrusions 21b can be improved. In other words, the holding pins 62 are molded by the holding pins 62 which hold the core base portion 12 in the central part of the cleaning soft portion molding portion 46. Since the positions of the holding pins 62 can be adjusted in the length direction and the circumferential direction with respect to the cleaning soft portion molding portion 46 so that the holding pins 62 do not interfere pith the forming positions of the cleaning protrusions 21b, the degree of freedom in the arrangement layout of the cleaning protrusions 21b can be improved. Further, the handle base portion 11 is formed flat. When the space between the molars is cleaned with the handle base portion 11 being gripped with the fingers, the cleaning portion 2 is curved within the plane substantially perpendicular to the plane including the handle base portion 11 (that is, in the mold opening and closing direction). Since the holding pins 62 are disposed so as to form the angle θ2 with respect to the mold opening and closing direction, the core base portion 12 can be effectively prevented from being broken from the core base portion recess 14Fa, which is formed by each of the holding pins 62, as a starting point.

(Analysis Result)

Next, a description will be given of analysis results of finite element analysis, in which the influence of the shape, arrangement positions, depth and cross-sectional area of the core base portion recesses 14a with respect to the bending force of the core base portion 12 was examined.

First, a description will be given of Examples 1 to 19 and Comparative Examples 1 and 2, in each of which the finite element analysis was performed. As a common configuration of the core base portion 12, a rod-shaped core base portion having a diameter of 0.65 mm and a length of 10 mm was used, in which core base portion recesses with a predetermined depth were formed in a first side portion and a second side portion. In the examples, tests were carried out while placing the first side portion at a lower position. Accordingly, a "lower surface" coincides with the first side portion, and an "upper surface" coincides with the second side portion. Further, the "planar shape of the recess" means a shape obtained when the core base portion recess is observed from above. The "diameter or width of the recess" means a diameter when a planar shape of the core base portion recess is circular, and when the planar shape is other than being circular, means a maximum length among lengths between intersections of planes (VS in FIG. 22) perpendicular to a central axis (CL in FIG. 22) of the core base portion and the end portions of the core base portion recess. The "length of the recess" means a maximum length among lengths (UL in FIG. 22) between intersections (T, B in FIG. 22) of the plane (BS in FIG. 22) including the central axis (CL in FIG. 22) of the core base portion and the end portions of the core base portion recess. The "depth of recess" means a "maximum depth of the core base portion recess".

In Examples 1 to 4, as a common configuration, the recesses centered on the positions of 3 mm and 6 mm from the tip end portions on the first side portion and second side portion of the core base portion were provided (totally 4 spots). That is, at the positions of 3 mm and 6 mm from the tip ends, two sets of the recesses, each set of which makes a pair formed at opposite positions shifted from each other by 180 degrees in the circumferential direction, were provided.

In Example 1, a bale shape (rectangular shape with curved short side portions, rectangular shape with rounded corners) was adopted for each of the recesses, in which a width along the circumferential direction of the core base portion was set to 0.4 mm, a maximum length in the axial direction of the core base portion was set to 0.6 mm, an opening area was set to 0.21 mm$^2$, and a maximum depth was set to 0.01 mm.

In Example 2, a bale shape (rectangular shape with curved short side portions, rectangular shape with rounded corners) was adopted for each of the recesses, in which a width along the circumferential direction of the core base portion was set to 0.4 mm, a maximum length in the axial direction of the core base portion was set to 1 mm, an opening area was set to 0.37 mm$^2$, and a maximum depth was set to 0.02 mm.

In Example 3, a rectangular shape was adopted for each of the recesses, in which a width along the circumferential direction of the core base portion was set to 0.4 mm, a length of the core base portion in the axial direction was set to 0.6 mm, an opening area was set to 0.24 mm$^2$, and a maximum depth was set to 0.01 mm.

In Example 4, a rectangular shape was adopted for each of the recesses, in which a width along the circumferential direction of the core base portion was set to 0.4 mm, a maximum length of the core base portion in the axial direction was set to 1 mm, an opening area was set to 0.4 mm$^2$, and a maximum depth was set to 0.03 mm.

In Example 5, on the first side portion of the core base portion, there was formed a bale shaped (rectangular shape with rounded come core base portion recess which had a depth of 0.07 mm was centered on the position of 6.0 mm from the tip end portion of the core base portion, had both end portions formed into a semicircular shape with a diameter of 0.4 mm, and had a length set to 1.14 mm in the axial direction of the core base portion. In addition, on the second side portion of the core base portion, there was formed a bale shaped (rectangular shape with rounded corners) core base portion recess which had a depth of 0.07 mm was centered on the position of 6.8 mm from the tip end portion of the core base portion, had both end portions formed into a semicircular shape with a diameter of 0.4 mm, and had a length set to 1.14 mm with respect to the axial direction of the core base portion. Then, an interval (gap) between the core base portion recesses on the first side portion side and the second side portion side in the axial direction of the core base portion was set to twice the maximum axial length of the core base portion recesses. That is, an interval between the core base portion recesses of the first side portion and the second side portion in the axial direction (UL direction in FIG. 22) of the core base portion was set to twice the maximum axial length of the core base portion recess. For the test, the first side portion was placed on the "lower surface". The "interval between the core base portion recesses of the first side portion and the second side portion in the axial direction of the core base portion" is obtained by the following procedure. First, a plane (BS in FIG. 22) including UL and a center line (CL in FIG. 22) of the core base portion is set. Next, perpendicular lines are drawn to CL from the intersections (B, in FIG. 22) of the respective core base portion recesses of the first side portion and the second side portion and the BS, and intersections of the perpendicular lines and CL are obtained. There is obtained a minimum length between the intersection of the perpendicular line and CL, which is obtained from the first side portion, and the intersection of the perpendicular line and CL, which is obtained from the second side portion. The obtained minimum length is defined as the "interval between the core base portion recesses of the first side portion and the second side portion in the axial direction of the core base portion".

In Example 6, there were formed bale shaped (rectangular shape with rounded corners) recesses which had both end portions formed into a semicircular shape with a diameter of 0.4 mm, and had a length of the recess set to 1.14 mm, as the core base portion recesses. In addition, an interval between the core base portion recesses of the first side portion and the second side portion in the axial direction of the core base portion was set to three times the maximum axial length of the core base portion recesses.

In Example 7, the core base portion 12 was configured similarly to that of Example 5 except that a rectangular recess in which a width of the recess was set to 0.4 mm and a length of the recess was set to 1.2 mm was formed, as each of the core base portion recesses.

In Example 8, the core base portion 12 was configured similarly to that of Example 6 except that a rectangular recess in which a width of the recess was set to 0.4 mm and a length of the recess was set to 1.2 mm was formed, as each of the core base portion recesses.

In Example 9, the core base portion 12 was configured similarly to that of Example 5 except that the interval between the core base portion recesses of the first side portion and the second side portion in the axial direction of the core base portion was set to 1 time the maximum axial length of the core base portion recess.

In Example 10, the core base portion 12 was configured similarly to that of Example 5 except that the interval between the core base portion recesses of the first side portion and the second side portion in the axial direction of the core base portion was set to one fourth times the maximum axial length of the core base portion recess.

In Example 11, the core base portion 12 was configured similarly to that of Example 7 except that the interval between the core base portion recesses of the first side portion and the second side portion in the axial direction of the core base portion was set to 1 time the maximum axial length of the core base portion recess.

In Example 12, the core base portion 12 was configured similarly to that of Example 10 except that the depth of the recess was set to 0.02 mm.

In Example 13, the core base portion 12 was configured similarly to that of Example 12 except that the interval between the core base portion recesses of the first side portion and the second side portion in the axial direction of the core base portion was set to 1 time the maximum axial length of the core base portion recess.

In Example 14, the core base portion 12 was configured similarly to that of Example 12 except that the depth of the recess was set to 0.05 mm.

In Example 15, the core base portion 12 was configured similarly to that of Example 14 except that the interval between the core base portion recesses of the first side portion and the second side portion in the axial direction of the core base portion was set to 1 time the maximum axial length of the core base portion recess.

In Example 16, as the core base portion recess, a rectangular recess was formed in which a width of the recess was set to 0.4 mm, a length of the recess was set to 1.14 mm, and a depth of the recess was set to 0.02 mm. In addition, the interval between the core base portion recesses of the first side portion and the second side portion in the axial direction of the core base portion was set to one fourth times the maximum axial length of the core base portion recess.

In Example 17, the core base portion 12 was configured similarly to that of Example 16 except that the interval between the core base portion recesses of the first side portion and the second side portion in the axial direction of the core base portion was set to 1 time the maximum axial length of the core base portion recess.

In Example 18, the core base portion 12 was configured similarly to that of Example 16 except that the depth of the recess of the core base portion recess was set to 0.05 mm.

In Example 19, the core base portion 12 was configured similarly to that of Example 17 except that the depth of the recess of the core base portion recess was set 0.05 mm.

In Comparative Examples 1 and 2, similarly to Examples 1 to 4 the recesses centered on the positions of 3 mm and 6 mm from the tip end portions on the first side portion and second side portion of the core base portion were provided (totally 4 spots) as a common configuration. That is, two sets of the recesses, each set of which makes a pair formed at opposite positions shifted from each other by 180 degrees in the circumferential direction, were provided at the positions of 3 mm and 6 mm from the tip ends. In Comparative Example 1, each of the recesses was formed into a circular shape with a diameter of 0.2 mm, in which an opening area was set to 0.031 mm$^2$, and a maximum depth was set to 0.05 mm.

In Comparative Example 2, each of the recesses was formed into a circular shape with a diameter of 0.1 mm, in which an opening area was set to 0.008 mm$^2$, and a maximum depth was set to 0.1 mm. Since the planar shape of the recesses of Comparative Examples 1 and 2 is circular, the "diameter of recess" is defined as the "width of recess".

Then, with regard to each of the core base portions of Examples 1 to 19 and Comparative Examples 1 and 2, one end portion thereof was fixed, and the core base portion was horizontally supported in a cantilever manner so that the core base portion recesses were disposed on the upper and lower surfaces of the core base portion. In this state, a force of 1 N was applied downward to the other end portion of the core base portion. At that time, a stress distribution in the periphery of each of the core base portion recesses was analyzed by finite element analysis. In addition, a maximum value of the stress in the periphery of the core base portion recess was obtained. The analysis results and the maximum stress values are shown in FIG. 27, FIG. 28, FIG. 29, FIG. 30, and FIG. 31.

Figure 28:
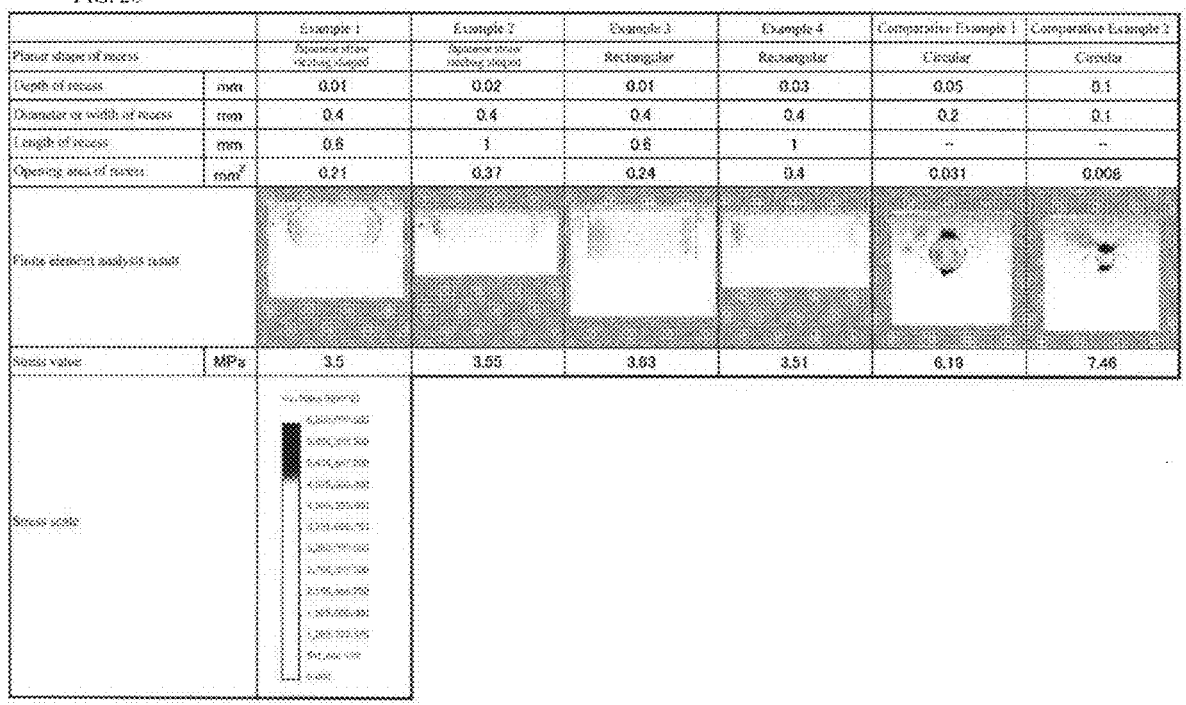
FIG. 28 shows analysis results and the maximum stress values.
Figure 30:
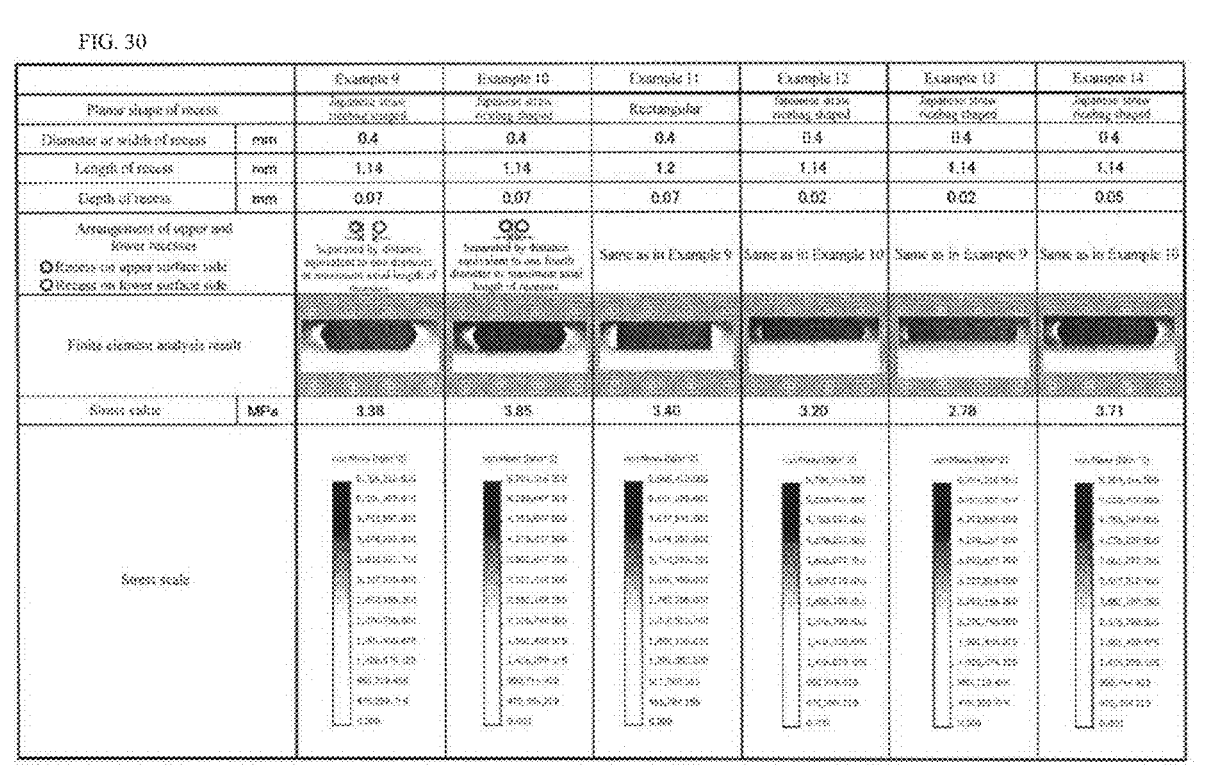

FIG. 27 shows results of the analyses on the recesses in the second side portion at the positions of 3 mm from the tip ends of Examples 1 to 4 and Comparative Examples 1 and 2. FIG. 28 shows results of the analyses on the recesses in the first side portion at the positions of 6 mm from the tip ends of Examples 1 to 4 and Comparative Examples 1 and 2. In the analysis results of FIG. 27, only the stress distributions of the core base portions in the peripheries of the core base portion recesses on the upper surface (second side portion) side are shown. In the analysis results of FIG. 28, FIG. 29, FIG. 30, and FIG. 31, only the stress distributions of the core base portions in the peripheries of the core base portion recesses on the lower surface (first side portion) side are shown. Further, in each of the analysis results shown in FIG. 27 and FIG. 28, a mesh is described in a background of the core base portion so that the outer shape of the core base portion becomes clear. In addition, a maximum point stress value at an edge portion of the recess was set as each of the stress values.

FIGS. 27 and 28 show the following. As in Examples 1 to 4, if the opening has a shape elongated in the axial direction of the core base portion, the stress values are reduced at both of the position of 3 mm from the tip end and the position of 6 mm from the tip end, and the core base portion hardly breaks even when the core base portion is bent greatly near each of the positions at the time of insertion into the space between the front teeth and insertion between the molars.

In addition, FIG. 27, FIG. 28, FIG. 29, FIG. 30, and FIG. 31 show that the core base portion recesses of the first side portion and the second side portion are arranged to be shifted in the axial direction so as not to overlap each other in the circumferential direction of the cleaning portion as in Examples 1 to 19 regardless of the depths of the core base portion recesses being the same or different. In such a situation, the stress value becomes small, so that the core base portion becomes less breakable even if the core base portion is bent at the time of the insertion into the space between the molars, and so on. From Examples 5 to 19, it is understood that the stress value tends to decrease as such a separation distance between the core base portion recesses of the upper and lower surfaces in the axial direction becomes larger. Further, it is understood that the stress value becomes smaller when the shape of the core base portion recesses is the bale shape (rectangular shape with curved short side portions, rectangular shape with rounded corners) or rectangular shape rather than a circular shape.

While the embodiments of the present invention have been described above, it is understood that the above embodiments are not intended at all to limit the present invention and the configurations of the embodiments may be changed or modified without departing from the gist of the present invention.

REFERENCE SIGNS LIST

1 Interdental cleaning tool
2 Cleaning portion
2D Cleaning portion
2F Cleaning portion
2G Cleaning portion
3 Handle portion
5 Interdental cleaning tool connected body
10 Base portion 10A Primary molded product
11 Handle base portion
11a Side surface
12 Core base portion
12a. Exposed portion
12b Core main body
13 Connecting portion
13a Boundary portion
14 Cleaning portion recess
14a Core base portion recess
14Da Cleaning portion recess
14F Cleaning portion recess
14Fa Core base portion recess
14G Cleaning portion recess
20 Soft portion
21 Cleaning soft portion
21a Covering portion
21b Cleaning protrusion
2A Cleaning portion
14A Cleaning portion recess
14Aa Core base portion recess
14B Cleaning portion recess
14Ba Core base portion recess
14C Cleaning portion recess
14Ca Core base portion recess
14D Cleaning portion recess
2E Cleaning portion
14E Cleaning portion recess
14Ea Core base portion recess
2F Cleaning portion
12F Core base portion
14F Cleaning portion recess
14Fa Core base portion recess
30 First die
31 First die
32 First molding space
32a Core base portion molding portion
32b Handle base portion molding portion
33 Runner
34 Gate
35 Connecting portion molding portion
36 Gate portion
37 Runner portion
40 Second die
40a Mating surface
41 Second die
41a Mating surface
42 Second molding space
43 Fitting space
44 Fitting space
45 Fitting space
46 Cleaning soft portion molding portion
46a Tip end portion
47 Gate
48 Runner
50 Tip end side holding pin
51 Intermediate portion holding pin
52 Base end side holding pin
55 Runner portion
56 Gate portion
50A-2A Holding pin
60 Holding pin
61 Holding pin
62 Holding pin
70 Central part
71 Side portion
72 Protrusion

The invention claimed is:

1. An interdental cleaning tool comprising:
a base portion made of a synthetic resin; and
a soft portion made of an elastomer that covers at least a part of the base portion,
the base portion including a handle base portion, and a core base portion that has an elongated shaft-shape and connects continuously to a tip end portion of the handle base portion,
the soft portion having at least a cleaning soft portion that covers the core base portion,
the handle base portion constituting a handle portion serving as a grip, and
the core base portion and the cleaning soft portion which constitute a cleaning portion for interdental cleaning,
wherein a plurality of cleaning portion recesses which penetrate the cleaning soft portion and form recesses in the core base portion are formed on each of a first side portion and a second side portion of the cleaning portion at an interval in an axial direction of the cleaning soft portion,
at least one set of two cleaning portion recesses among plural sets of the cleaning portion recesses paired between the first side portion and the second side portion are formed at an interval in the axial direction of the cleaning portion so as to be avoided from overlapping each other in a circumferential direction of the cleaning portion,
the interval between the two cleaning portion recesses of the one set in the axial direction of the cleaning portion is set to three times or less of a maximum axial length of the cleaning portion recess, and
at least one of the plurality of cleaning portion recesses is formed so that an opening of the core base portion recess formed in the core base portion has a shape elongated in the axial direction of the cleaning portion.

2. The interdental cleaning tool according to claim 1, wherein the opening of the core base portion recess, which is elongated in the axial direction, has an area of 0.15 mm$^2$ or more and 0.6 mm$^2$ or less.

3. The interdental cleaning tool according to claim 1, wherein the core base portion recess that is elongated in the axial direction has a maximum axial length of 0.4 mm or more and 1.5 mm or less.

4. The interdental cleaning tool according to claim 1, wherein the at least one set of the cleaning portion recesses formed at the interval in the axial direction has, therebetween, an interval along the axial direction of the cleaning portion, the interval being set to one fourth or more of a maximum axial length of the cleaning portion recesses.

5. The interdental cleaning tool according to claim 1, wherein the cleaning portion recesses which form the core base portion recesses having the shape elongated in the axial direction are formed individually on the first side portion and second side portion of the cleaning portion, which correspond to a predetermined spot within a range of 5.5 mm to 7.0 mm from the tip end of the core base portion.

6. The interdental cleaning tool according to claim 1, wherein the cleaning portion recesses are arranged at a substantially uniform interval, or at an interval narrowed as approaching to a tip end of the cleaning portion in the axial direction of the cleaning portion.

7. The interdental cleaning tool according to claim 1, wherein the core base portion recesses have a maximum depth of 0.01 mm or more and 0.085 mm or less.

* * * * *